United States Patent
Itou et al.

(10) Patent No.: US 6,780,131 B2
(45) Date of Patent: Aug. 24, 2004

(54) HYDRAULIC CONTROL APPARATUS FOR AUTOMATIC TRANSMISSION

(75) Inventors: Masahiro Itou, Anjo (JP); Hideaki Ogasawara, Anjo (JP); Naoyuki Fukaya, Anjo (JP); Mikio Iwase, Anjo (JP); Kazuhisa Ozaki, Anjo (JP); Keizo Kobayashi, Anjo (JP); Hiromichi Kimura, Toyota (JP); Yoshihiro Iijima, Toyota (JP); Koichi Tanaka, Toyota (JP); Shigeki Hiramatsu, Toyota (JP); Kazuyuki Watanabe, Toyota (JP)

(73) Assignees: Aisin Aw Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 14 days.

(21) Appl. No.: 09/818,870

(22) Filed: Mar. 28, 2001

(65) Prior Publication Data

US 2001/0036878 A1 Nov. 1, 2001

(30) Foreign Application Priority Data

Mar. 29, 2000 (JP) .......................................... 2000-91953

(51) Int. Cl.$^7$ ............................................... F16H 31/00
(52) U.S. Cl. ......................... 475/127; 475/119; 477/906
(58) Field of Search ........................... 475/98, 116, 156, 475/136, 137, 119, 127; 477/163, 164, 906, 907

(56) References Cited

U.S. PATENT DOCUMENTS

| | | | |
|---|---|---|---|
| 4,301,697 A | * 11/1981 | Iwanaga et al. | ............ 477/141 |
| 4,428,259 A | * 1/1984 | Kubo et al. | ..................... 235/9 |
| 4,494,423 A | 1/1985 | McCarthy et al. | |
| 4,527,448 A | 7/1985 | Person et al. | |
| 4,541,308 A | 9/1985 | Person et al. | |
| 4,628,771 A | 12/1986 | Person et al. | |
| 4,691,597 A | 9/1987 | Leorat et al. | |
| 4,903,551 A | 2/1990 | Hiramatsu et al. | |
| 5,010,786 A | 4/1991 | Hiramatsu et al. | |
| 5,383,379 A | 1/1995 | Niiyama | |
| 5,403,242 A | * 4/1995 | Wakahara et al. | .......... 475/119 |
| 5,538,479 A | 7/1996 | Niiyama | |
| 5,616,093 A | * 4/1997 | Long et al. | ................. 475/120 |
| 5,649,880 A | * 7/1997 | Tsutsui et al. | .............. 477/125 |
| 5,681,241 A | 10/1997 | Kubo et al. | |
| 5,919,108 A | * 7/1999 | Takagi | ........................ 475/127 |
| 6,299,560 B1 | * 10/2001 | Fujioka et al. | .............. 475/119 |
| 6,464,610 B1 | * 10/2002 | Hisano et al. | .............. 475/119 |

FOREIGN PATENT DOCUMENTS

| | | |
|---|---|---|
| EP | 0 711 936 A2 | 5/1996 |
| EP | 0 947 742 A2 | 10/1999 |
| JP | 63-210443 | 9/1988 |
| JP | 09-303545 | 11/1997 |
| JP | A 11-280878 | 10/1999 |
| JP | 2000-170899 | 6/2000 |
| JP | 2000-170900 | 6/2000 |

* cited by examiner

*Primary Examiner*—Jack Lavinder
*Assistant Examiner*—Bradley King
(74) *Attorney, Agent, or Firm*—Oliff & Berridge, PLC

(57) ABSTRACT

To prevent the neutral state from being formed in a change gear apparatus and allow the obtaining of an intended gear change appropriately during a servo malfunction. Hydraulic servos engage and disengage a plurality of friction engagement elements; a hydraulic pressure supply system supplies the hydraulic servo of a predetermined friction engagement element with hydraulic pressure; and an auxiliary hydraulic pressure supply systems supplies a predetermined hydraulic servo with another hydraulic pressure, in the case where the hydraulic pressure supply system is placed in a first unsupplied state where the hydraulic pressure supply system cannot supply the hydraulic servo of the predetermined friction engagement element with hydraulic pressure. The auxiliary hydraulic pressure supply system does not supply the predetermined hydraulic servo with the other hydraulic pressure, in the case that the hydraulic pressure supply system is placed in a second unsupplied state where the hydraulic pressure supply system does not supply the hydraulic servo of the predetermined friction engagement element with hydraulic pressure.

18 Claims, 8 Drawing Sheets

FIG. 3

| SHIFT POSITION | | | SOLENOID VALVE | | | | | | CLUTCH | | | | BRAKE | | | OWC | |
|---|---|---|---|---|---|---|---|---|---|---|---|---|---|---|---|---|---|
| | | | S4 | S5 | DSL | SL1 | SL2 | SL3 | C0 | C1 | C2 | C3 | B1 | B2 | B3 | F1 | F2 |
| P | | | × | × | × | ○ | ○ | ○ | × | × | × | × | × | × | ○ | × | × |
| R | | | × | × | × | ○ | ○ | ○ | × | × | ○ | × | × | ○ | ○ | × | × |
| R (INHIBIT) | | | ○ | ○ | × | ○ | ○ | ○ | × | × | × | × | × | × | × | × | × |
| N | | | × | × | × | ○ | ○ | ○ | × | × | × | × | × | × | ○ | × | × |
| D | 1st | | × | × | × | ○ | ○ | × | × | ○ | × | × | × | × | ○ | ○ | ○ |
| | 2nd | | × | × | × | × | ○ | × | × | ○ | × | × | ○ | × | ○ | × | ○ |
| | 3rd | | × | ○ | ◎ | ○ | ◎ | × | ○ | ○ | × | × | × | × | ○ | × | ○ |
| | 4th | | × | ○ | ◎ | × | ◎ | ○ | ○ | × | × | × | ○ | × | ○ | × | ○ |
| | 5th | | ○ | ○ | ◎ | × | ◎ | ○ | ○ | × | × | ○ | ○ | × | × | × | × |
| 3 | 1st | | × | × | × | ○ | ○ | × | × | ○ | × | × | × | × | ○ | ○ | ○ |
| | 2nd | | × | × | × | × | ○ | × | × | ○ | × | × | ○ | × | ○ | × | ○ |
| | 3rd | | × | ○ | ◎ | ○ | ◎ | × | ○ | ○ | × | × | × | × | ○ | × | ○ |
| 2 | 1st | | × | × | ○ | ○ | ○ | × | × | ○ | × | × | × | ○ | ○ | ○ | ○ |
| | 2nd | | × | × | × | × | ○ | × | × | ○ | × | × | ○ | × | ○ | × | ○ |
| D,3 | | | × | × | × | × | × | × | ○ | ○ | × | ○ | × | × | × | × | × |
| 2 | 3rd | | × | × | × | × | × | × | ○ | ○ | × | × | × | × | ○ | × | ○ |
| REMARKS | | ○ | ON | | | | | | ENGAGED | | | | | | | LOCK | |
| | | × | OFF | | | | | | RELEASED | | | | | | | FREE | |
| | | ◎ | | | | | | | — | | | | | | | — | |

SPEED FOR ALL SOLENOIDS OFF

APPROXIMATE 4TH

ON: LOCK-UP ON
OFF: LOCK-UP OFF

HYDRAULIC CONTROL APPARATUS FOR AUTOMATIC TRANSMISSION

BACKGROUND OF THE INVENTION

1. Field of Invention

The invention relates to a hydraulic control apparatus for an automatic transmission.

2. Description of Related Art

Conventionally, an automatic transmission used for a vehicle, such as automobile, has been provided in which a change gear apparatus provided with a planetary gear unit or the like is included, the change gear apparatus comprising a plurality of friction engagement elements, such as a clutch, a brake, and the like, and a plurality of speeds are achieved by selectively outputting revolutions from the gear elements, such as a sun gear, a ring gear, a carrier and the like of the planetary gear unit, by engaging and disengaging respective friction engagement elements in a predetermined combination.

The friction engagement elements are engaged and disengaged by operating a hydraulic servo in a hydraulic circuit. The hydraulic servo comprises a hydraulic servo drum having an outer circumferential wall and an inner circumferential wall, an annular piston slidably fitted in the hydraulic servo drum, and the like. The friction engagement element disposed opposite to the annular piston is engaged and disengaged through the movement of the annular piston by supplying oil to an apply oil chamber defined between the hydraulic servo drum and the annular piston.

Moreover, various solenoid valves, a switching valve and the like are disposed in the hydraulic circuit, and a predetermined switching valve is switched over. The hydraulic servo connected with the switching valve is supplied with hydraulic pressure, by turning ON and OFF a solenoid of a predetermined solenoid valve.

In an automatic transmission of the above structure, one or more predetermined friction engagement elements are engaged in the case of achieving a certain speed; however, the change gear apparatus interlocks, when a failure (abnormality) is generated in the solenoid valve and a friction engagement element not required to be engaged is engaged.

Therefore, there is provided an hydraulic circuit for preventing the change gear apparatus from interlocking, when the hydraulic servo of the friction engagement element not required to be engaged is supplied with hydraulic pressure, by switching over a predetermined switching valve by the hydraulic pressure, and stopping hydraulic pressure supply to the hydraulic servo of the friction engagement element (refer to the Japanese Patent Application Laid-Open No. 63-210443).

The conventional hydraulic circuit can prevent the change gear apparatus from interlocking when a friction engagement element not required to be engaged is engaged, that is, in a failed state where the hydraulic servo is supplied with hydraulic pressure. However, when a friction engagement element required to be engaged is not engaged, that is, in a failed state where the hydraulic servo is not supplied with hydraulic pressure, depending on the type of automatic transmission, there is the possibility that a neutral state is formed in the gear change, power can not be transmitted through the gear change, and not only an intended gear change can not be realized appropriately, but also the vehicle can not run.

SUMMARY OF THE INVENTION

It is an object of the invention to solve the problem of the conventional hydraulic circuit, to provide a hydraulic control apparatus for automatic transmission that can prevent a neutral state from being formed in the gear change, and to perform an intended gear change appropriately.

To achieve the aforementioned object, the hydraulic control apparatus for an automatic transmission in accordance with the invention comprises a plurality of hydraulic servos engaging and disengaging respectively a plurality of friction engagement elements; hydraulic pressure supply means for supplying a hydraulic servo of a predetermined friction engagement element selected in correspondence to a speed to be achieved with hydraulic pressure; and auxiliary hydraulic pressure supply means for supplying a predetermined hydraulic servo with a hydraulic pressure other than the hydraulic pressure generated by the hydraulic pressure supply means, in the case that the hydraulic pressure supply means is placed in a first unsupplied state (failed state) where the hydraulic pressure supply means can not supply the hydraulic servo of the predetermined friction engagement element with hydraulic pressure.

Moreover, the auxiliary hydraulic pressure supply means does not supply the predetermined hydraulic servo with the other hydraulic pressure, in the case that the hydraulic pressure supply means is placed in a second unsupplied state (under underlap control) where the hydraulic pressure supply means does not supply the hydraulic servo of the predetermined friction engagement element with hydraulic pressure.

In this case, when the hydraulic pressure supply means is placed in the first unsupplied state where the hydraulic pressure supply means can not supply the hydraulic servo of the predetermined friction engagement element with hydraulic pressure, the predetermined hydraulic servo is supplied with a hydraulic pressure other than the hydraulic pressure generated by the hydraulic pressure supply means. Therefore, a predetermined speed can be achieved, preventing a neutral state from being formed in the change gear apparatus.

On the other hand, when the hydraulic pressure supply means is placed in a second unsupplied state where the hydraulic pressure supply means does not supply the hydraulic servo of the predetermined friction engagement element with hydraulic pressure, the another hydraulic pressure is not supplied to the predetermined hydraulic servo. Accordingly, the underlap control can be performed, and the intended gear change can be performed appropriately.

In another hydraulic control apparatus for an automatic transmission in accordance with the invention, further, the hydraulic pressure supply means is put in the second unsupplied state (under underlap control) during a predetermined gear change (during gear change under underlap control).

In still another hydraulic control apparatus for automatic transmission in accordance with the invention, further, the auxiliary hydraulic pressure supply means is failsafe means, and provided with switching means for not supplying the predetermined hydraulic servo with the other hydraulic pressure during a predetermined gear change (during gear change under underlap control).

In still another hydraulic control apparatus for automatic transmission in accordance with the invention, further, the predetermined friction engagement elements are two friction engagement elements, forming a state allowing transmitting of power in the gear change by engaging the two friction engagement elements.

Moreover, the auxiliary hydraulic pressure supply means is provided with hydraulic pressure generation detection means for detecting generation of hydraulic pressure to be supplied to the hydraulic servo of at least one of the two friction engagement elements. Then, the other hydraulic pressure is not supplied to the predetermined hydraulic servo, in the case of detection of generation of the hydraulic pressure.

Still another hydraulic control apparatus for automatic transmission in accordance with the invention, comprises a plurality of friction engagement elements; a plurality of hydraulic servos engaging and disengaging respectively the plurality of friction engagement elements; hydraulic pressure supply means for generating a predetermined hydraulic pressure, and supplying the predetermined hydraulic pressure to the hydraulic servo of the predetermined friction engagement element selected in correspondence to a speed to be achieved; a switching valve including an input section where the hydraulic pressure generated by the hydraulic pressure supply means is input and an output section for outputting a hydraulic pressure other than the hydraulic pressure generated by the hydraulic pressure supply means in order to supply to the predetermined hydraulic servo; and valve switching means for further switching over the switching valve in a state where there is no hydraulic pressure input to the input section, and the switching valve switches over to output the other hydraulic pressure.

In this case, when the hydraulic pressure is not input into the input section, the switching valve is switched over to output another hydraulic pressure; the valve switching means further switches over the switching valve in this state. Therefore, the predetermined speed corresponding to the hydraulic servo can be achieved, by supplying the hydraulic pressure to the predetermined hydraulic servo, thereby preventing the neutral state from being formed in the change gear apparatus.

Moreover, if the valve switching means further switches over the switching valve, the another hydraulic pressure is not supplied to the predetermined hydraulic servo. Therefore, the underlap control can be performed, and the intended gear change can be performed.

In still another hydraulic control apparatus for automatic transmission in accordance with the invention, further, the predetermined friction engagement elements are two friction engagement elements. And, a state allowing transmitting of power in the change gear apparatus is formed by engaging the two friction engagement elements.

Moreover, the hydraulic pressure to be supplied to the hydraulic servo of the two friction engagement elements is input to the input section.

In still another hydraulic control apparatus for automatic transmission in accordance with the invention, further, the switching valve is provided with countering means against the hydraulic pressure input to the input section, and generating a counter force against the switching force with which the valve switching means switches over the switching valve.

Still another hydraulic control apparatus for automatic transmission in accordance with the invention further has another friction engagement element than the two friction engagement elements.

In addition, the switching valve is provided with a hydraulic pressure supply detection section for detecting a simultaneous supply of hydraulic pressure to be supplied to the two friction engagement elements and the hydraulic servo of the another friction engagement element; and a section not supplied with hydraulic pressure for not supplying the hydraulic servo of the another friction engagement element upon detection of the simultaneous supply of hydraulic pressure to be supplied to the two friction engagement elements and the hydraulic servo of the another friction engagement element.

In this case, when the hydraulic pressure to be supplied to the hydraulic servo of the two friction engagement elements and the another friction engagement element at the same time, the hydraulic pressure is not supplied to the hydraulic servo of the another friction engagement element, thereby preventing the change gear apparatus from interlocking.

Still another hydraulic control apparatus for automatic transmission in accordance with the invention further comprises a switching control valve that is provided with a first input section to which the hydraulic pressure to be supplied to the hydraulic servo of the predetermined friction engagement element is input, and a second input section to which the hydraulic pressure to be supplied to the hydraulic servo of the another friction engagement element is input, for generating a signal hydraulic pressure to be supplied to the switching valve when the hydraulic pressure to be supplied to the hydraulic servo of the predetermined friction engagement element, and the hydraulic pressure to be supplied to the hydraulic servo of the another friction engagement element are input to the first and second input sections.

BRIEF DESCRIPTION OF THE DRAWINGS

Embodiments of the invention will be described in detail hereinafter with reference to the drawings; in which:

FIG. 3 shows an operation table of the automatic transmission in accordance with the first embodiment;

DETAILED DESCRIPTION OF PREFERRED EMBODIMENTS

Figure 2:
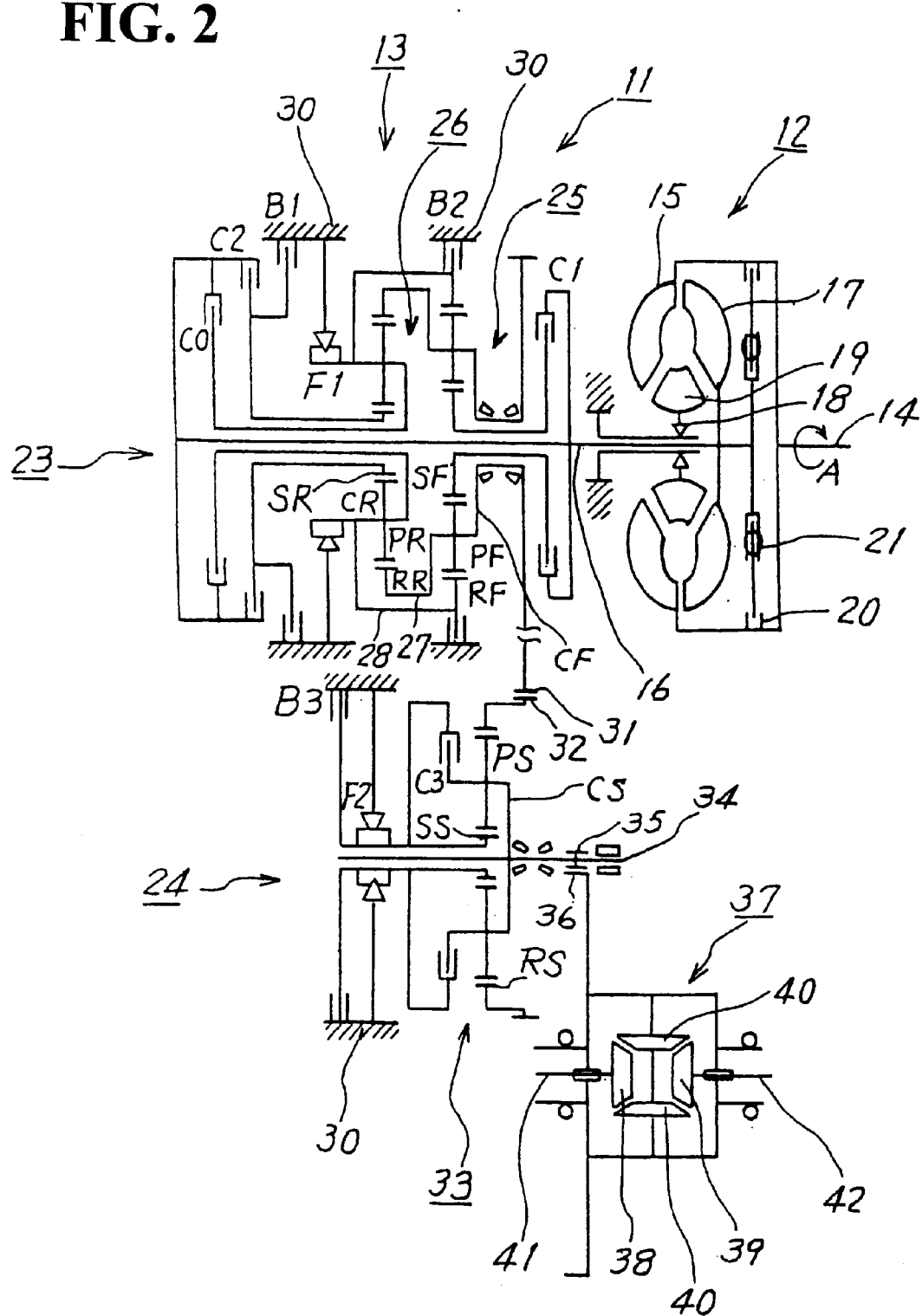
FIG. 2 is a schematic diagram of an automatic transmission in accordance with the first embodiment.

FIG. 2 is a schematic diagram of an automatic transmission in accordance with a first embodiment of the invention and FIG. 3 shows the operation table for the automatic transmission in accordance with the first embodiment.

Shown in FIG. 2, is an automatic transmission 11. The automatic transmission 11 comprises, as gear elements, a front planetary gear unit 25, a rear planetary gear unit 26 and a planetary gear unit 33, as well as, as friction engagement elements, a first clutch C1, a second clutch C2, a third clutch C3, a fourth clutch C0, a first brake B1, a second brake B2 and a third brake B3. The automatic transmission 11 engages/disengages predetermined friction engagement elements for forming a state to transmit power in a change gear apparatus 13.

Moreover, a torque converter 12 transmits revolutions generated by driving an engine (not shown) to the automatic transmission 11 in the arrow A direction, and the change gear apparatus 13 changes the speed and outputs the revolutions transmitted from the torque converter 12. The torque converter 12 comprises a pump impeller 15 coupled with an output shaft 14 by which the revolutions of the engine are outputted, a turbine runner 17 coupled with an input shaft 16 for inputting the revolutions into the change gear apparatus 13, a stator 19 attached on a one-way clutch 18, a lock-up clutch 20 for coupling the output shaft 14 and the input shaft 16 by locking when a predetermined condition is satisfied, a damper 21 and the like.

The change gear apparatus 13 comprises a main change gear 23 and an auxiliary change gear 24. Besides, the main change gear 23 includes the front planetary gear unit 25 and the rear planetary gear unit 26. The front planetary gear unit 25 is comprised of a sun gear SF, a ring gear RF disposed coaxially with the sun gear SF, a pinion PF meshed with the sun gear SF and ring gear RF, and a carrier CF for rotationally supporting the pinion PF. The rear planetary gear unit 26 is comprised of a sun gear SR, a ring gear RR disposed coaxially with the sun gear SR, a pinion PR meshed with the sun gear SR and ring gear RR, and a carrier CR for rotationally supporting the pinion PR.

The carrier CF and the ring gear RR are linked by a linkage element 27, while the carrier CR and the ring gear RF are linked by a linkage element 28. Moreover, respectively through the first clutch C1, the sun gear SF and the input shaft 16, and through the second brake B2 and the first one-way clutch F1 disposed in parallel with each other, the ring gear RF and the automatic transmission case 30, are linked selectively and, at the same time, the carrier CF and a counter drive gear 31 are linked. Further, respectively through the second clutch C2, the sun gear SR and the input shaft 16, through the first brake B1, the sun gear SR and the automatic transmission case 30, through the fourth clutch C0, the carrier CR and the input shaft 16, and through the second brake B2 and the first one-way clutch F1 disposed in parallel with each other, the carrier CR and the automatic transmission case 30, are linked selectively.

The auxiliary change gear 24 comprises the planetary gear unit 33, and the planetary gear unit 33 is comprised of a sun gear SS, a ring gear RS disposed coaxially with the sun gear SS, a pinion PS meshed with the sun gear SS and ring gear RS, and a carrier CS for rotatably supporting the pinion PS. Respectively, through the third brake B3 and the second one-way clutch F2 disposed in parallel to each other, the sun gear SS and the automatic transmission case 30, and through the third clutch C3, the sun gear SS and the carrier CS are linked selectively, and at the same time, the ring gear RS and a counter driven gear 32 are linked.

Further, a counter drive gear 31 and the counter driven gear 32 are meshed to transmit the revolutions of the main change gear 23 to the auxiliary change gear 24. Moreover, the carrier CS and the counter shaft 34 are linked, while an output gear 35, fixed to the counter shaft 34, and a larger ring gear 36 of a differential apparatus 37 are meshed. The differential apparatus 37 comprises right and left side gears 38, 39, a pinion 40 meshed with respective side gears 38, 39, and distributes the revolutions transmitted through the larger ring gear 36 to a drive shaft 41, 42.

The first one-way clutch F1 is released, when an outer race (not shown) is fixed to the automatic transmission case 30 and an inner race (not shown) is forced to rotate in the same direction as the arrow A (normal direction) with the carrier CR, and is locked when the inner race is forced to rotate in a direction opposite to the arrow A (reverse direction). On the other hand, the second one-way clutch F2 is locked, when the outer race is fixed to the automatic transmission case 30 and the inner race is forced to rotate in the normal direction with the sun gear SS, and released when the inner race is forced to rotate in the reverse direction.

Now, the operation of the automatic transmission 11 will be described. In FIG. 3, SL1 to SL3 denote normal open type first to third solenoid valves, S4, S5 normal closed type fourth and fifth solenoid valves, DSL a normal closed type sixth solenoid valve, C1 the first clutch, C2 the second clutch, C3 the third clutch, C0 the fourth clutch, B1 the first brake, B2 the second brake, B3 the third brake, F1 the first one-way clutch (OWC) and F2 the second one-way clutch.

As for shift positions, P denotes a parking range, R a reverse range, N a neutral range, D a forward range, 3 a third range, 2 a second range, 1st a first speed, 2nd a second speed, 3rd a third speed, 4th a fourth speed and 5th a fifth speed.

Furthermore, ○ denotes an ON state for the first to sixth solenoid valves SL1 to SL3, S4, S5 and DSL, an engaged state for the first through fourth clutches C1, C2, C3, C0, the first through third brakes B1, B2, B3, and a locked state for the first and second one-way clutches F1, F2. X denotes an OFF state for the first to sixth solenoid valves SL1 to SL3, S4, S5 and DSL, a released state for the first through fourth clutches C1, C2, C3, C0, the first through third brakes B1, B2, B3, and a free state for the first and second one-way clutches F1, F2. Moreover, ⊚ shows that the lock-up clutch 20 (FIG. 2) becomes ON when it is engaged (L-UP ON) and OFF when the lock-up clutch 20 is released (L-UP OFF).

Then, in the first speed of the forward range, the first clutch C1 and the third brake B3 are engaged. In this case, in the main change gear 23, the revolution (rotation in the normal direction) of the engine transmitted to the input shaft 16 is transmitted to the sun gear SF through the first clutch C1. The sun gear SF and the pinion PF being meshed, when the sun gear SF makes the carrier CF to rotate in the normal direction, the carrier CF, being linked to driving wheels 41, 42 through the counter drive gear 31 and the auxiliary change gear 24, generate a reaction force. As a result, the ring gear RF is forced to rotate in the reverse direction. However, the ring gear RF being linked to the first one-way clutch F1 through the linkage element 28, the rotation in the reverse direction is inhibited. Consequently, a reduced normal direction rotation is output from the carrier CF, and transmitted to the auxiliary change gear 24 through the counter drive gear 31.

In the auxiliary change gear 24, when the counter driven gear 32 is rotated in the reverse direction by the rotation of the counter drive gear 31, the ring gear RS also is rotated in the reverse direction. On the other hand, when the ring gear RS is rotated, the sun gear SS is forced to rotate in the normal direction, but the rotation in the normal direction is inhibited, because the sun gear SS is linked to the second one-way clutch F2. Consequently, the auxiliary change gear 24 is placed in the under drive state, the revolution of the first speed in the normal direction is output from the carrier CS, and transmitted to the differential apparatus 37 through the output gear 35.

In the second speed of the forward range, the first clutch C1, the first brake B1 and the third brake B3 are engaged. In this case, in the main change gear 23, the sun gear SR is locked by the engagement of the first brake B1. A reduced rotation is output from the carrier CF as a result, and transmitted to the auxiliary change gear 24 through the counter drive gear 31. Consequently, the auxiliary change gear 24 is placed in the under drive state, the revolution of the second speed in the normal direction is output from the carrier CS, and transmitted to the differential apparatus 37 through the output gear 35.

In the third speed of the forward range, the first clutch C1, the fourth clutch C0 and the third brake B3 are engaged. In this case, in the main change gear 23, the front planetary gear unit 25 and the rear planetary gear unit 26 are placed in the direct connection state by the engagement of the first clutch C1 and the fourth clutch C0, and a rotation in the normal direction of the same revolving speed as the engine speed is output from the carrier CF, and transmitted to the auxiliary change gear 24 through the counter drive gear 31. Consequently, the auxiliary change gear 24 is placed in the under drive state, the revolution of the third speed in the normal direction is output from the carrier CS, and transmitted to the differential apparatus 37 through the output gear 35.

In the fourth speed of the forward range, the fourth clutch C0, the first brake B1 and the third brake B3 are engaged. In this case, the sun gear SR is locked, and as a rotation in the normal direction of the same revolving speed as the engine speed is transmitted to the carrier CR through the fourth clutch C0, an accelerated rotation is output from the ring gear RR and the carrier CF, and transmitted to the auxiliary change gear 24 through the counter drive gear 31. Consequently, the auxiliary change gear 24 is placed in the under drive state, the revolution of the fourth speed in the normal direction is output from the carrier CS, and transmitted to the differential apparatus 37 through the output gear 35.

In the fifth speed of the forward range, the third clutch C3, the fourth clutch C0 and the first brake B1 are engaged. In this case, in the main change gear 23, the sun gear SR is locked, and as a rotation in the normal direction of the same revolving speed as the engine speed is transmitted to the carrier CR through the fourth clutch C0, an accelerated rotation is output from the ring gear RR and the carrier CF, and transmitted to the auxiliary change gear 24 through the counter drive gear 31.

Consequently, the auxiliary change gear 24 is placed in the overdrive state, the planetary gear unit 33 is placed in the direct connection state by the engagement of the third clutch C3, the revolution of the fifth speed in the normal direction is output from the carrier CS, and transmitted to the differential apparatus 37 through the output gear 35.

Now, the hydraulic circuit will be described.

Figure 1:
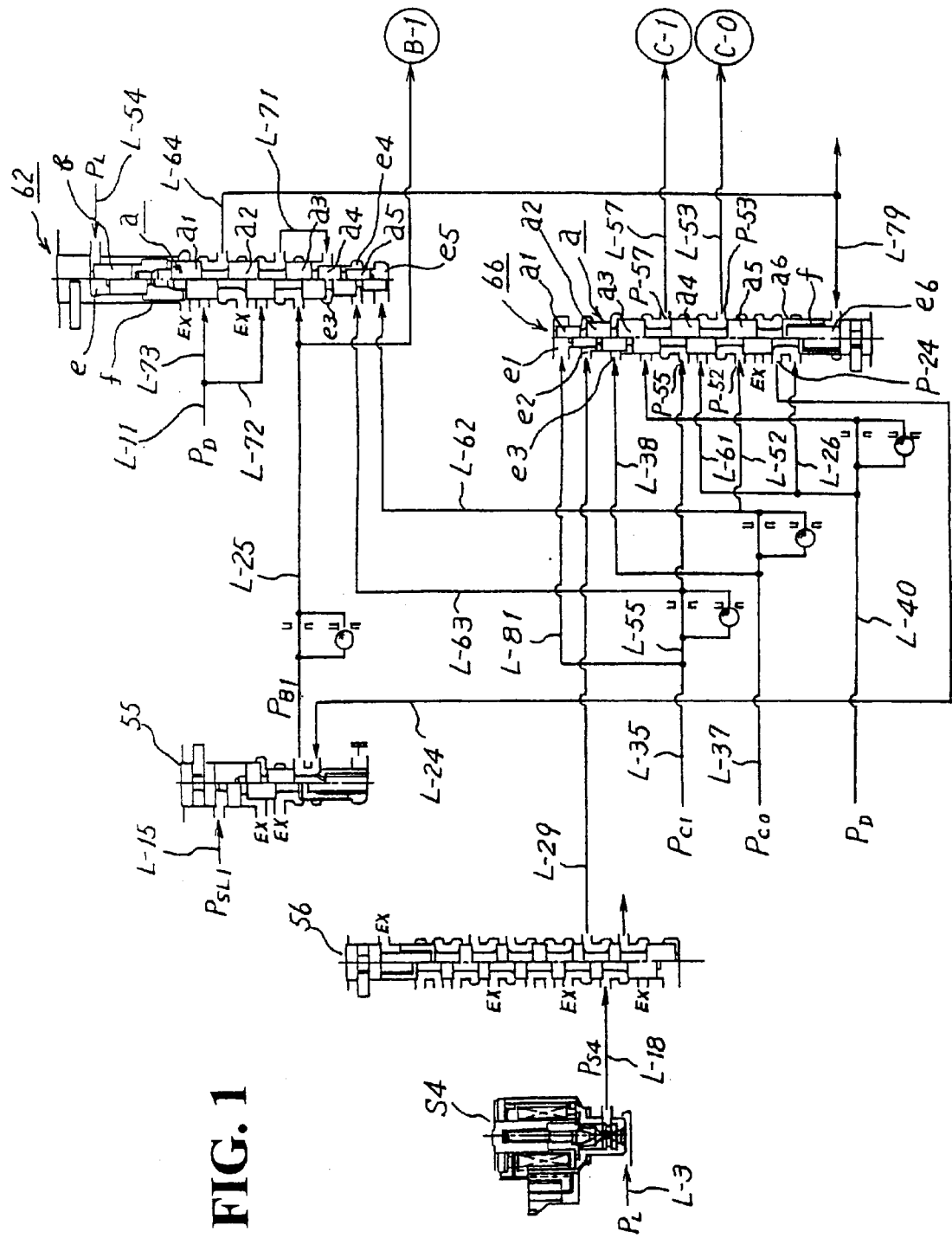
FIG. 1 is a diagram showing essential parts of a hydraulic circuit in accordance with a first embodiment of the invention.
Figure 4:
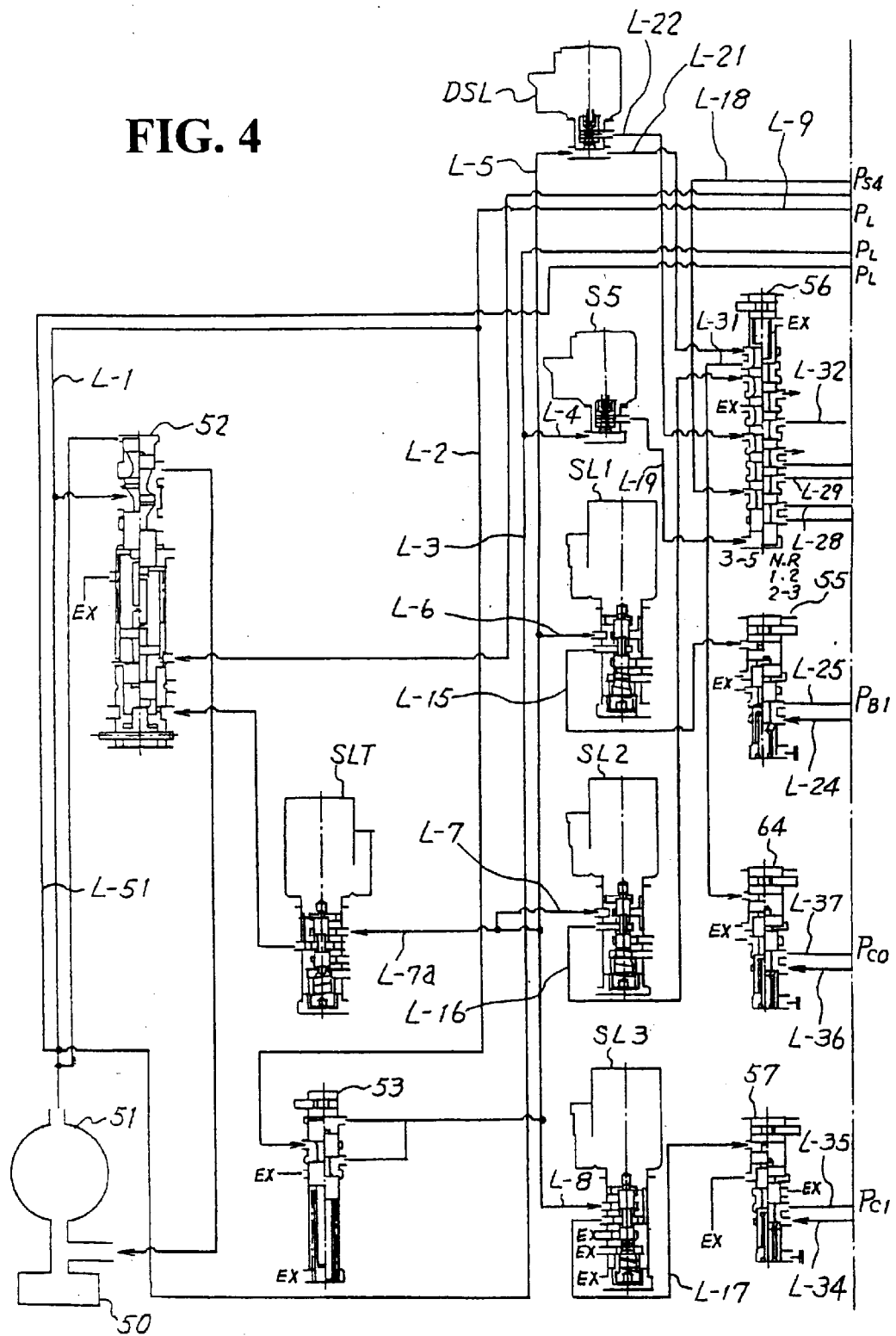
FIG. 4 is a left half of diagram showing the hydraulic circuit in accordance with the first embodiment.
Figure 5:
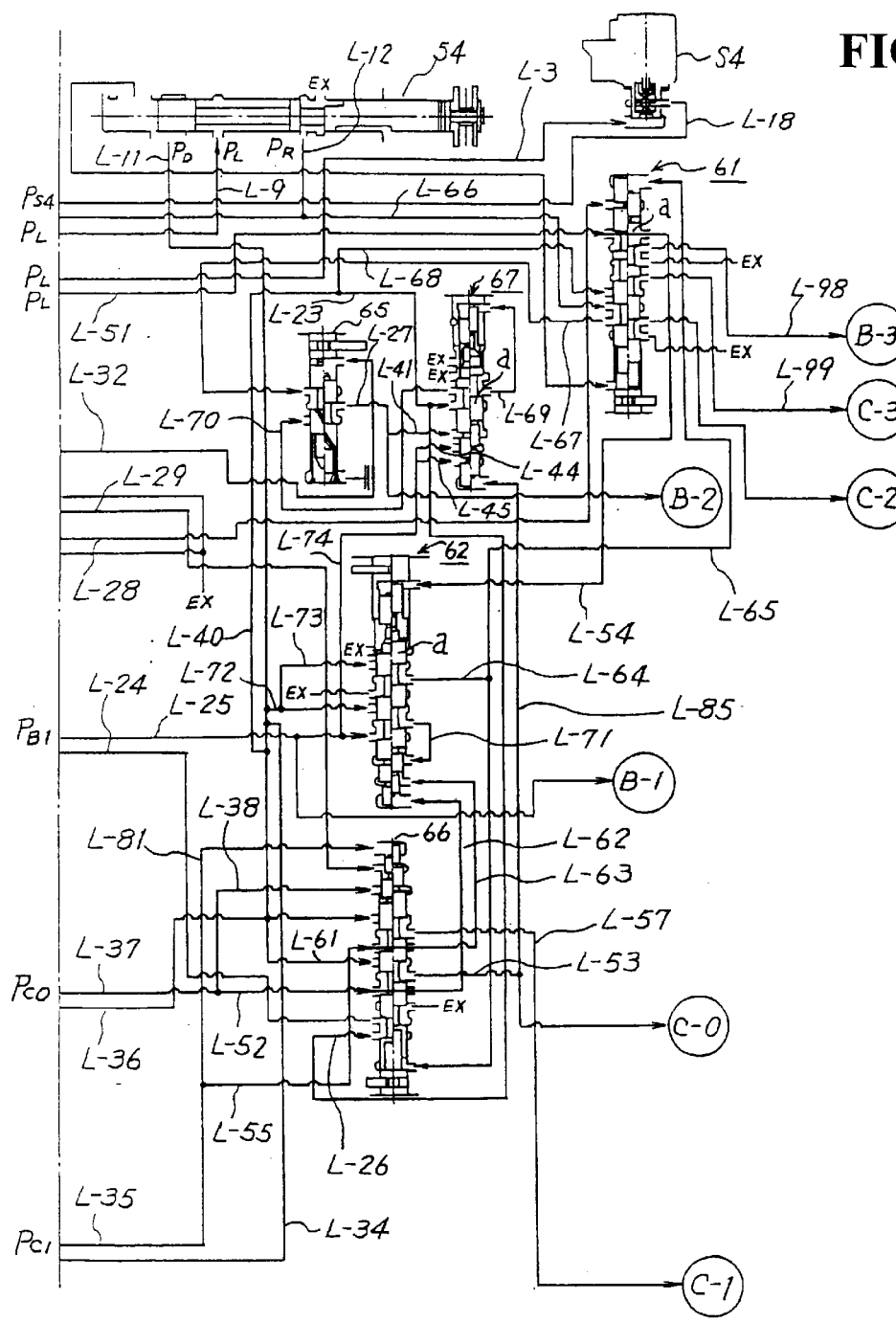
FIG. 5 is a right half of diagram showing the hydraulic circuit in accordance with the first embodiment.
Figure 6:
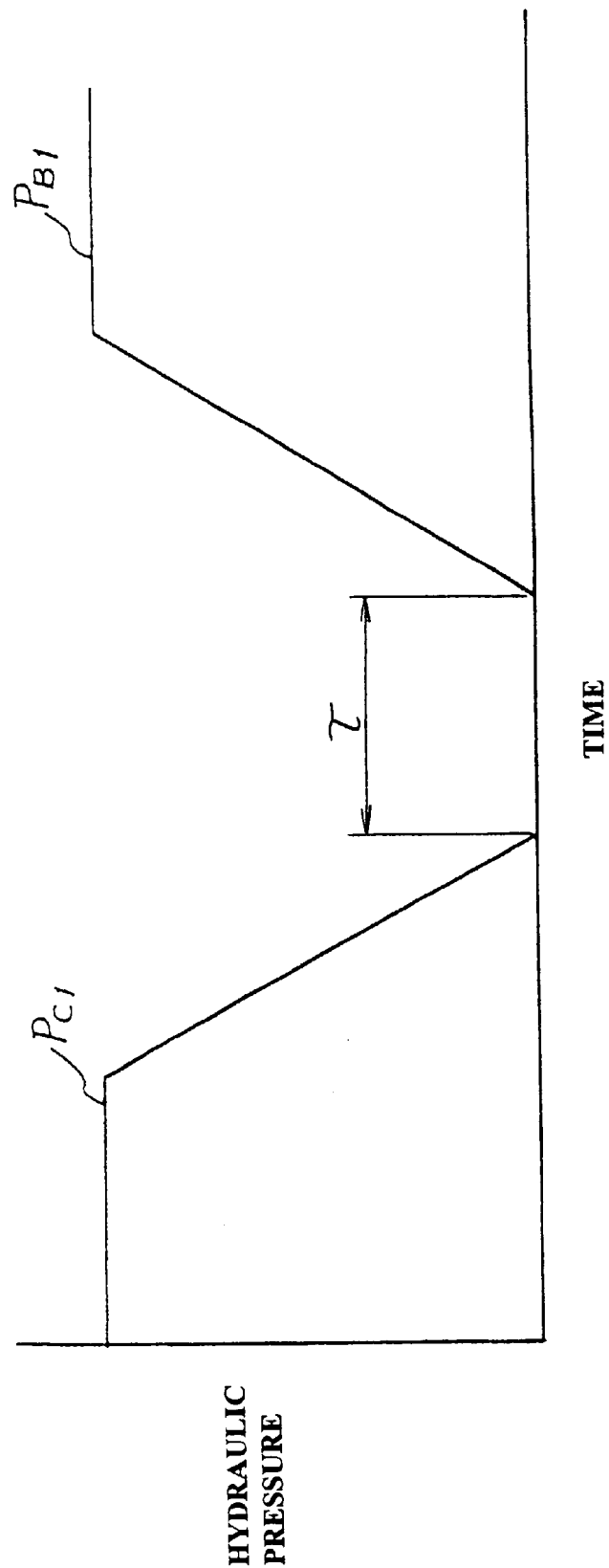
FIG. 6 is a graph explaining an underlap control circuit in accordance with the first embodiment.
Figure 7:
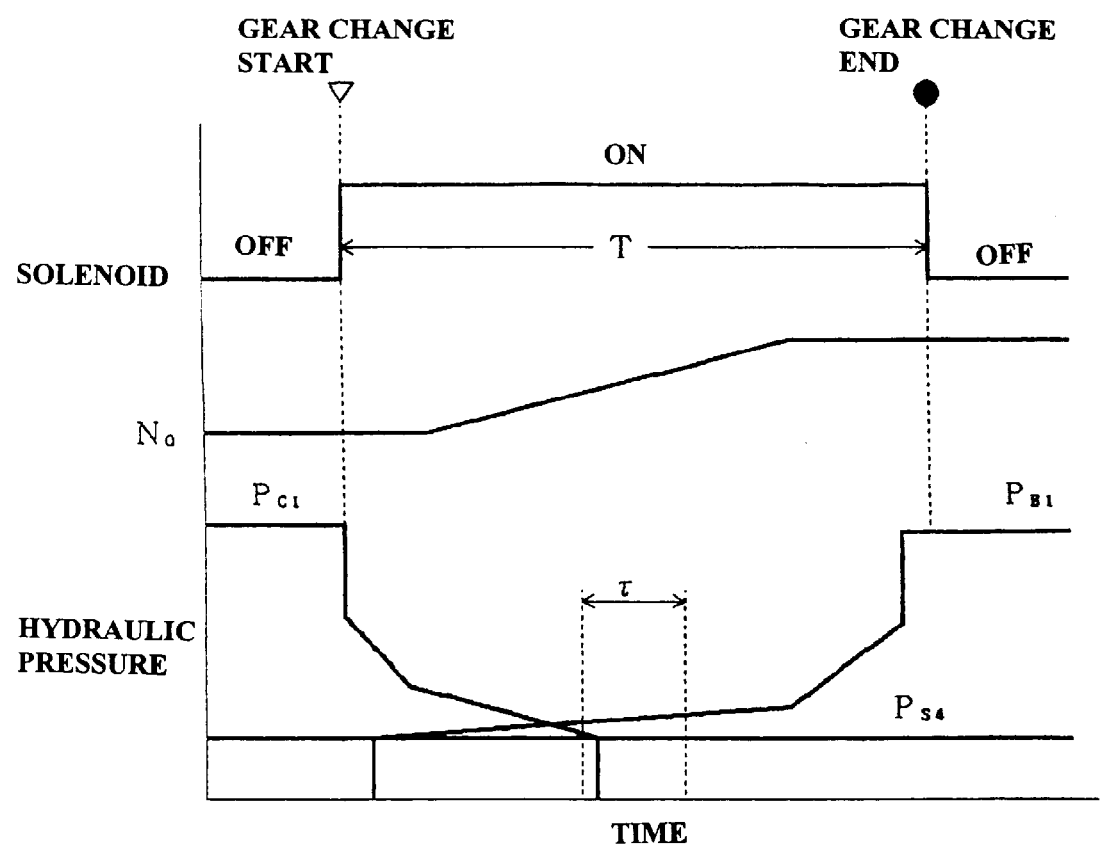
FIG. 7 is a time chart showing the operation of a hydraulic control apparatus of the automatic transmission in accordance with the first embodiment.

FIG. 1 shows essential parts of a hydraulic circuit in accordance with a first embodiment of the invention, FIG. 4 is a left half of a diagram showing the hydraulic circuit, FIG. 5 is a right half of the diagram showing the hydraulic circuit, FIG. 6 is a graph explaining an underlap control circuit and FIG. 7 is a time chart showing the operation of a hydraulic control apparatus of an automatic transmission, all in accordance with the first embodiment. In FIG. 6, the abscissa axis denotes the time and the ordinate axis denotes the hydraulic pressure. FIG. 1, and FIGS. 4 and 5 are substantially equivalent, except for oil line connections.

In the figures, C-1, C-2, C-3, C-0, B-1, B-2, and B-3 are hydraulic servos for engaging/disengaging respectively the first clutch C1, the second clutch C2, the third clutch C3, the fourth clutch C0, the first brake B1, the second bake B2, and the third brake B3 according to hydraulic supply and discharge. A predetermined hydraulic servo among the respective hydraulic servos C-1, C-2, C-3, C-0, B-1, B-2, and B-3 in correspondence to the selection of a speed to be achieved, by gear change processing means of a not shown control apparatus, is supplied with a predetermined hydraulic pressure for application.

In addition, a strainer 50, an oil pump 51 for sucking and discharging oil from an oil reservoir (not shown) through the strainer 50, and a primary regulator valve 52, which generates a predetermined line pressure $P_L$ by regulating the pressure in an oil line L-1 are shown. The line pressure $P_L$ is supplied to a solenoid modulator valve 53 through an oil line L-2, and regulated by the solenoid modulator valve 53 to generate a solenoid modulator pressure.

Then, the line pressure $P_L$, generated by the primary regulator valve 52, is supplied to the fourth solenoid valve S4 as switching means or valve switching means, through the oil lines L-1, L-3, and at the same time, to the fifth solenoid valve S5 through the oil lines L-1, L-3, and L-4. The solenoid modulator pressure generated by the solenoid modulator valve 53 is supplied to the sixth solenoid valve DSL through an oil line L-5, to the first solenoid valve SL1 through an oil line L-6, to the second solenoid valve SL2 through an oil line L7, to the third solenoid valve SL3 through an oil line L-8, and to the seventh solenoid valve SLT through an oil line L-7a.

The first to third solenoid valves SL1 to SL3 and seventh solenoid valve SLT are normal open type solenoid valves, no signal hydraulic pressure is generated when each solenoid is turned ON (energized), and a signal hydraulic pressure is generated when each solenoid is turned OFF (de-energized). On the other hand, the fourth to sixth solenoid valves S4, S5, and DSL are normal closed type solenoid valves, a signal hydraulic pressure is generated when each solenoid is turned ON (energized), and no signal hydraulic pressure is generated when each solenoid is turned OFF (de-energized).

Further, the line pressure $P_L$ is supplied to a manual valve 54 through the oil lines L-1, L-9. The manual valve 54 is switched over by operating a speed selector apparatus (not shown), such as shift lever or switch. When the forward range is selected, a D range pressure $P_D$ is generated in an oil line L-11 and, when the reverse range is selected, an R pressure $P_R$ is generated in an oil line L-12, respectively.

The first solenoid valve SL1 receives a first solenoid signal SG1 from the control apparatus, regulates the solenoid modulator pressure supplied from the solenoid modulator valve 53, generates a signal hydraulic pressure $P_{SL1}$, and supplies the signal hydraulic pressure $P_{SL1}$ to a B-1 control valve 55 through an oil line L-15. The second solenoid valve SL2 receives a second solenoid signal SG2 from the control apparatus, regulates the solenoid modulator pressure supplied from the solenoid modulator valve 53, generates a signal hydraulic pressure $P_{SL2}$, and supplies the signal hydraulic pressure $P_{SL2}$ to a solenoid relay valve 56 through an oil line L-16. The third solenoid valve SL3 receives a third solenoid signal SG3 from the control apparatus, regulates the solenoid modulator pressure supplied from the solenoid modulator valve 53, generates a signal hydraulic pressure $P_{SL3}$, and supplies the signal hydraulic pressure $P_{SL3}$ to a C-1 control valve 57 through an oil line L-17.

The fourth solenoid valve S4, upon reception of a fourth solenoid signal SG4 from the control apparatus, turns ON/OFF the solenoid, generates a signal hydraulic pressure $P_{S4}$ when the solenoid is ON, and supplies the signal hydraulic pressure $P_{S4}$ to the solenoid valve 56 through an oil line L-18. The fifth solenoid valve S5, upon reception of a fifth solenoid signal SG5 from the control apparatus, turns ON/OFF the solenoid, generates a signal hydraulic pressure $P_{S5}$ when the solenoid is ON, and supplies the signal hydraulic pressure $P_{S5}$ to the solenoid relay valve 56 through an oil line L-19. Further, the sixth solenoid valve DSL, upon reception of a sixth solenoid signal SG6 from the control apparatus, regulates the solenoid modulator pressure supplied from the solenoid modulator valve 53, generates a signal hydraulic pressure $P_{DSL}$, and supplies the signal hydraulic pressure $P_{DSL}$ to the solenoid relay valve 56 through oil lines L-21, L-22.

The solenoid relay valve 56 which is switched over by the signal hydraulic pressure $P_{S5}$ supplied through the oil line L-19, takes the left half position in the third speed and higher, communicates oil lines L-21, L-31 and oil lines L-18, L-28, and supplies the solenoid modulator pressure supplied through the oil lines L-5, L-21 to a C-0 control valve 64, and the signal hydraulic pressure $P_{S4}$ supplied through the oil lines L-3, L-18 to a 4-5 shift valve 61, respectively. The solenoid relay valve 56 takes the right half position in the second speed and lower and during 2-3 gear change, communicates oil lines L-16, L-31, oil lines L-22, L-32, and oil lines L-18, L-29, and supplies the signal hydraulic pressure $P_{SL2}$ supplied through the oil line L-16 to the C-0 control valve 64, the signal hydraulic pressure $P_{DSL}$ supplied through the oil line L-22 to a B-2 control valve 65, while the signal hydraulic pressure $P_{S4}$ supplied through the oil line L-18 to a clutch apply control valve 66 as auxiliary hydraulic pressure supply means and failsafe means, respectively.

The second and sixth solenoid valves SL2, DSL are used for lock-up control of the torque converter 12 in the third speed or higher. Therefore, in the third speed or higher, when the solenoid relay valve 56 takes the left half position, the signal hydraulic pressure supplied through the oil line L-16 is supplied to a lock-up control valve (not shown), and the signal hydraulic pressure supplied through the oil line L-22 is supplied to a lock-up relay valve (not shown).

The first solenoid valve SL1 and the B-1 control valve 55 comprise the first hydraulic pressure supply means; the second solenoid valve SL2, solenoid relay valve 56 and C-0 control valve 64 the second hydraulic pressure supply means; and the third solenoid valve SL3 and C-1 control valve 57 the third hydraulic pressure supply means. On the other hand, the B-1 control valve 55, C-1 control valve 57 and C-0 control valve 64 comprise the control valve. The first to third hydraulic pressure supply means and the clutch apply control valve 66 comprise a hydraulic pressure control apparatus.

The B-1 control valve 55 receives the signal hydraulic pressure $P_{SL1}$ supplied through the oil line L-15, regulates the D range pressure $P_D$ supplied through the oil lines L-11, L-40, L-23, L-26, the clutch apply control valve 66, and the oil line L-24, generates a B-1 control pressure $P_{B1}$, and supplies the B-1 control pressure $P_{B1}$ to the B-1 apply control valve 62 as a switching control valve through the oil line L-25.

The C-1 control valve 57 receives the signal hydraulic pressure $P_{SL3}$ supplied through the oil line L-17, regulates the D range pressure $P_D$ supplied through the oil lines L-11, L-34, generates a C-1 control pressure $P_{C1}$, and supplies the C-1 control pressure $P_{C1}$ to the clutch apply control valve 66 through the oil lines L-35, L-81, and to the B-1 apply control valve 62 through the oil lines L-55, L-63. The C-0 control valve 64 receives the signal hydraulic pressure $P_{SL2}$ supplied through the oil line L-31, regulates the D range pressure $P_D$ supplied through the oil lines L-11, L-36, generates the C-0 control pressure $P_{C0}$, and supplies the C-0 control pressure $P_{C0}$ to the clutch apply control valve 66 through oil lines L-37, L-38, and to the B-1 apply control valve 62 through the oil lines L-37, L-52, and L-62. The C-1 control pressure $P_{C1}$ comprises a first predetermined hydraulic pressure, C-0 control pressure $P_{C0}$ a second predetermined hydraulic pressure, and B-1 control pressure $P_{B1}$ a third predetermined hydraulic pressure, respectively.

The B-2 control valve 65 is supplied with a signal hydraulic pressure through the oil line L-32, regulates the D range pressure $P_D$ supplied through the oil lines L-11, L-40, B-2 apply control valve 67, and an oil line L-70, generates a B-2 control pressure $P_{B2}$, and supplies the B-2 control pressure $P_{B2}$ to the B-2 apply control valve 67 through the oil lines L-27, L-41. The B-1 apply control valve 62, clutch apply control valve 66 and B-2 apply control valve 67 are switching valves.

The clutch apply control valve 66 takes selectively the left half position as a first position, and the right half position as a second position. The clutch apply control valve 66 takes the left half position by the C-0 control pressure $P_{C0}$ supplied through the oil lines L-37, L-38, and supplies the C-0 control pressure $P_{C0}$ supplied through the oil lines L-37, L-52 to the hydraulic servo C-0 through the oil line L-53. Further, the clutch apply control valve 66 takes the left half position by the C-1 control pressure $P_{C1}$ supplied through the oil lines L-35, L-81, and supplies the C-1 control pressure $P_{C1}$ supplied through the oil lines L-35, L-55 to the hydraulic servo C-1 through the oil line L-57.

Moreover, the clutch apply control valve 66 is supplied with the D range pressure $P_D$ as another hydraulic pressure through the oil lines L-11, L-61, or through the oil lines L-11, L-40, L-23, L26. When the C-0 control pressure $P_{C0}$ or C-1 control pressure $P_{C1}$ and signal hydraulic pressure $P_{S4}$ are not supplied to the clutch apply control valve 66, the clutch apply control valve 66 takes the right half position by the bias force of a spring f (FIG. 1) as countering means, the oil lines L-11, L-53 and the oil lines L-61, L-57 communicate respectively, the D range pressure $P_D$ is supplied to the hydraulic servo C-1, C-0, thereby blocking between the oil lines L-26, L-24. On the other hand, when the clutch apply control valve 66 takes the left half position, the communication is blocked between the oil lines L-11, L-53, and between the oil lines L-61, L-57.

Next, the B-1 apply control valve 62 takes selectively the left half position as a first position, and the right half position as a second position. The B-1 apply control valve 62 takes the left half position by the line pressure $P_L$ supplied through the oil line L-1, oil line L-51, 4-5 shift valve 61, and oil line L-54, and receives, through the oil line L-71, the B-1 control pressure $P_{B1}$ supplied through the oil line L-25. Further, the B-1 apply control valve 62 takes the right half position by the C-0 control pressure $P_{C0}$ supplied through the oil lines L-37, L-52, clutch apply control valve 66, and the oil line L-62, as well as the C-1 control pressure $P_{C1}$ supplied through the oil lines L-35, L-55, clutch apply control valve 66, and oil line L-63, and, in the right half position, supplies the D range pressure $P_D$ supplied through the oil lines L-11, L-72 to the oil line L-71, and supplies the D range pressure $P_D$ supplied through the oil lines L-11, L-72, and L-73 as a signal hydraulic pressure $P_{FS}$ to the 4-5 shift valve 61 through the oil lines L-64, L-65.

Moreover, in the B-1 apply control valve 62, the B-1 control pressure $P_{B1}$, C-0 control pressure $P_{C0}$, and C-1 control pressure $P_{C1}$ act to move a spool (FIG. 1) a upwards, so that the B-1 apply control valve 62 takes the right half position. The oil lines L-73, L-64 communicate when the three pressures, namely the B-1 control pressure $P_{B1}$, C-0 control pressure $P_{C0}$ and C-1 control pressure $P_{C1}$ are supplied and total of the respective hydraulic pressures attains a predetermined pressure. Accordingly, the D range pressure $P_D$ as the signal hydraulic pressure $P_{FS}$ is supplied to the clutch apply control valve 66 through the oil line L-79.

The 4-5 shift valve 61 is supplied with a signal pressure through the oil line L-28 or oil line L-65, takes the left half position for the first to fourth speeds, and the right half position for the fifth speed. In the left half position, the line pressure $P_L$ supplied through the oil lines L-1, L-51 is supplied to the B-1 apply control valve 62 through the oil line L-54, and to the hydraulic servo B-3 through the oil line L-98, and at the same time, the R range pressure $P_R$ supplied through the oil lines L-12, L-66 is supplied to the B-2 control valve 65 through the oil line L-67. On the other hand, in the right position, the D range pressure $P_D$ supplied through the oil lines L-11, L-40 and L-68 is supplied to the hydraulic servo C-3 through the oil line L-99. The signal hydraulic pressure to the 4-5 shift valve 61 is generated by the fourth solenoid valve S4, is supplied through the oil line L-18, solenoid relay valve 56 and oil line L-28, and places the spool a in the right half position.

Next, the B-2 apply control valve 67 takes the left half position by the D range pressure $P_D$ supplied through the oil lines L-11, L-40, L-23, and L-69, and supplies the D range pressure $P_D$ supplied through the oil lines L-11, L-40, and L-23 to the B-2 control valve 65 through the oil line L-70. The B-2 apply control valve 67 is supplied with the B-2 control pressure $P_{B2}$ through the oil line L-41, the hydraulic pressure to be supplied to the hydraulic servo C-0 through the oil line L-85, and the B-1 control pressure $P_{B1}$ through the oil lines L-25, L-74, L-44 and L-45 and acts to move the spool a upwards, so that the B-2 apply control valve 67 takes the right half position. Communication is blocked between the oil lines L-23 and L-70, and the oil line L-70 communicates with a drain port, when two of the three pressures of the B-2 control pressure $P_{B2}$, hydraulic pressure to be supplied to the hydraulic servo C-0 and B-1 control pressure $P_{B1}$, are supplied and the total of the two hydraulic pressures attains a predetermined pressure.

Operation of the hydraulic circuit in the respective speeds will be described referring to the hydraulic circuit of FIGS. 1, 4 and 5, and the operation table of FIG. 3.

First, in the first speed, other than the second range, the line pressure $P_L$ regulated by the primary regulator valve 52 is supplied to the 4-5 shift valve 61 through the oil lines L-1, L-51. The 4-5 shift valve 61 is not supplied with the signal hydraulic pressure from the fourth solenoid valve S4, and takes the left half position. Accordingly, the oil lines L-51 and L-98 communicate, and the line pressure $P_L$ is supplied to the hydraulic servo B-3, thereby engaging the third brake B3.

Moreover, as the solenoid of the first solenoid valve SL1 is turned ON, and the communication is blocked between the oil lines L-6, L-15, the signal hydraulic pressure is not generated in the oil line L-15, and the hydraulic pressure is not supplied to the B-1 control valve 55. Consequently, the communication is blocked between the oil lines L-24, L-25, so the B-1 control pressure $P_{B1}$ is not generated in the oil line L-25.

Similarly, the solenoid of the second solenoid valve SL2 is turned ON, and the communication is blocked between the oil lines L-7, L-16.

Even when the solenoid of the fifth solenoid valve SL5 is turned OFF and the solenoid relay valve 56 takes the right half position so that the oil lines L-16 and L-31 communicate, the signal hydraulic pressure is not generated in the oil line L-16, and the hydraulic pressure is not supplied to the C-0 control valve 64. Consequently, the communication is blocked between the oil lines L-36, L-37, so the C-0 control pressure $P_{C0}$ is not generated in the oil line L-37.

The third solenoid valve SL3 generates a predetermined signal hydraulic pressure in the oil line L-17 according to a signal from the control apparatus, taking the solenoid modulator pressure of the oil line L-8 as base pressure. The signal hydraulic pressure generated in the oil line L-17 is sent to the C-1 control valve 57, and the D range pressure $P_D$ supplied through the oil lines L-11, L-34 because the C-1 control pressure $P_{C1}$ and is supplied to the clutch apply control valve 66 through the oil lines L-35, L-81, or through the oil lines L-35, L-55. The C-1 control pressure $P_{C1}$ supplied to the clutch apply control valve 66 through the oil lines L-35, L-55 is supplied to the B-1 apply control valve 62, and acts so that the B-1 apply control valve 62 takes the left half position.

The C-1 control pressure $P_{C1}$ supplied to the clutch apply control valve 66 through the oil lines L-35, L-55 is supplied to the hydraulic servo C-1 through the oil line L-57, and engages the first clutch C1.

Then, the solenoid of the sixth solenoid valve DSL is turned OFF, and the communication is blocked between the oil lines L-5, L-22. As the signal hydraulic pressure is not generated in the oil line L-22, the solenoid of the fifth solenoid valve SL5 is turned OFF and the solenoid relay valve 56 takes the right half position. So, even through the oil lines L-22 and L-32 communicate, the B-2 control valve 65 is not supplied with hydraulic pressure, and takes the left half position. Consequently, communication is blocked between the oil lines L-70, L-27, so the B-2 control pressure $P_{B2}$ is not generated in the oil line L-41.

Thus, the first clutch C1 and the third brake B3 engage and the first one-way clutch F1 is locked to achieve the first speed.

In the case of the second range, it is necessary to engage the second brake B2 to activate the engine brake. The sixth solenoid valve DSL generates the signal hydraulic pressure $P_{DSL}$ in the oil line L-22 in correspondence to the sixth solenoid signal SG6 sent from the control apparatus, taking the solenoid modulator pressure of the oil line L-5 as a base pressure.

As the solenoid of the fifth solenoid valve SL5 is turned OFF and the solenoid relay valve 56 takes the right half position, the oil lines L-22, L-32 communicate, and the signal hydraulic pressure $P_{DSL}$ supplied from the sixth solenoid signal SG6 is supplied to the B-2 control valve 65 through the oil line L-32. The B-2 control valve 65 controls the degree of communication between the oil lines L-70, L-27 according to the signal hydraulic pressure $P_{DSL}$ supplied from the sixth solenoid valve DSL, and generates the B-2 control pressure $P_{B2}$ in the oil line L-27. The B-2 control pressure $P_{B2}$ is supplied to the hydraulic servo B-2 of the second brake B2 through the oil line L-27, and engages the second brake B2. Whereby, the engine brake of the first speed is achieved.

Now, the second speed will be described.

The second speed is achieved by engaging the first brake B1 in addition to the state of the first speed other than the second range. The control apparatus outputs the first solenoid signal SG1 to the first solenoid valve SL1 that has been energized during the first speed, and generates a hydraulic pressure corresponding to the first solenoid signal SG1 in the oil line L-15, taking the hydraulic pressure of the oil line L-6 as base pressure. In the first speed, the communication is blocked between the oil lines L-24, L-25, and the oil line L-25 communicates with a drain port. However, in the second speed, the degree of communication between the oil lines L-24, L-25 is controlled based on the signal hydraulic pressure $P_{SL1}$ supplied through the oil line L-15, in correspondence to the first solenoid signal SG1 from the control apparatus. As a result, the B-1 control pressure $P_{B1}$ is generated in the B-1 control valve 55, and supplied to the hydraulic servo B-1 through the oil line L-25.

Next, the third speed will be described.

The third speed is achieved by engaging the fourth clutch C0 and releasing the first brake B1, in addition to the state of the second speed. In short, the third speed is achieved by engaging the first clutch C1, the fourth clutch C0, and the third brake B3. When the solenoid of the first solenoid valve SL1 is turned OFF in correspondence to the first solenoid signal SG1 from the control apparatus, the oil line L-25 and the drain port communicate, and the hydraulic pressure in the hydraulic servo B-1 of the first brake B1, engaged in the state of the second speed, is drained.

The second solenoid valve SL2 is controlled to generate the predetermined signal hydraulic pressure $P_{SL2}$ in the oil line L-16 based on the solenoid signal SG2 from the control apparatus, taking the solenoid modulator pressure of the oil line L-7 as a base pressure. The signal hydraulic pressure $P_{SL2}$ is supplied to the solenoid relay valve 56 through the oil line L-16.

Although the solenoid relay valve 56 takes the left half position in the third speed or higher, it remains in the right half position until the third speed is achieved including during 2-3 gear change. During the 2-3 gear change, the oil line L-16 communicates with the oil line L-31 through the solenoid relay valve 56, and the signal hydraulic pressure $P_{SL2}$ is supplied to the C-0 control valve 64 through the oil line L-16, solenoid relay valve 56, and oil line L-31. As a result, the D range pressure $P_D$ supplied through the oil lines L-11, L-36 is controlled to the C-0 control pressure $P_{C0}$, and supplied to the clutch apply control valve 66 through the oil lines L-37, L-38, and, through the oil lines L-37, L-52. The C-0 control pressure $P_{C0}$ supplied to the clutch apply control valve 66 through the oil lines L-37, L-52 acts so that the clutch apply control valve 66 takes the left half position.

In addition, the C-0 control pressure $P_{C0}$ supplied to the clutch apply control valve 66 through the oil lines L-37, L-52 is supplied to the hydraulic servo C-0 of the fourth clutch C0 through the oil line L-53, engages the fourth clutch C0, and at the same time, is supplied to the B-1 apply control valve 62 through the oil line L-62, and acts to switch over the B-1 apply control valve 62 to the right half position. The engagement pressure of the hydraulic servo C-0 is supplied to the B-2 apply control valve 67 through the oil line L-85, and acts to switch over the B-2 apply control valve 67 to the left half position.

Upon completion of the gear change to the third speed, the solenoid of the fifth solenoid valve SL5 is turned ON by the fifth solenoid signal SG5 from the control apparatus, and generates the signal hydraulic pressure $P_{S5}$ in the oil line L-19 taking the line pressure $P_L$ of the oil lines L-1, L-4 as a base pressure. Thereby, the solenoid relay valve 56 takes the left half position, and a lock-up control valve (not shown) is controlled by the second and sixth solenoid valves SL2, DSL.

With the solenoid relay valve 56 taking the left half position, the solenoid modulator pressure output from the solenoid modulator valve 53 is supplied to the C-0 control valve 64 through the oil lines L-5, L-21, solenoid relay valve 56, and oil line L-31, and acts to maintain the communication between the oil lines L-36, L-37. Therefore, in the third speed or higher, the engagement state of the fourth clutch C0 is maintained. Moreover, as the oil line L-32, that has been supplying signal hydraulic pressure for controlling the B-2 control valve 65, is connected to the drain port when the solenoid relay valve 56 is switched over to the left half position, the B-2 control valve 65 remains in the left half position, and the communication is blocked between the oil lines L-70, L-27.

Now, the fourth speed will be explained.

The fourth speed is achieved by engaging the first brake B1 and releasing the fourth clutch C0, in addition to the state of the third speed. In short, the fourth speed is achieved by engaging the fourth clutch C0, the first brake B1, and the third brake B3. When the solenoid of the third solenoid valve SL3 is turned ON in correspondence to the third solenoid signal SG3 from the control apparatus, the hydraulic pressure in the hydraulic servo C-1 of the first clutch C1, engaged in the third speed, is drained through the oil line L-57, clutch apply control valve 66, the oil lines L-55, L-35, and C-1 control valve 57. The first clutch C1 is thus released.

The first solenoid valve SL1 generates the signal hydraulic pressure $P_{SL1}$ in the oil line L-15, based on the solenoid signal SG1 from the control apparatus, taking the solenoid modulator pressure of the oil line L-6 as a base pressure. The signal hydraulic pressure $P_{SL1}$ is then supplied to the B-1 control valve 55 through the oil line L-15. The B-1 control valve 55 generates the B-1 control pressure $P_{B1}$ in the oil line L-25, taking the D range pressure $P_D$ of the oil line L-24 as a base pressure. The B-1 control pressure $P_{B1}$ is supplied to the hydraulic servo B-1 of the first brake B1 through the oil line L-25. The first brake B1 is thus engaged.

Now, the fifth speed will be explained.

The fifth speed is achieved by engaging the third clutch C3 and releasing the third brake B3, in addition to the state of the fourth speed. In short, the fifth speed is achieved by engaging the third clutch C3, the fourth clutch C0, and the first brake B1. When the signal hydraulic pressure $P_{S4}$ from the fourth solenoid valve SL4 is no longer supplied to the 4-5 shift valve 61 in correspondence to the fourth solenoid signal SG4 from the control apparatus, the 4-5 shift valve 61 which has been taking the left half position is switched over to the right half position. At that time, communication is blocked between the oil lines L-51, L-98, the oil line L-98 communicates with the drain port through the 4-5 shift valve 61, and the hydraulic pressure in the hydraulic servo B-3 is drained. The third brake B3 is thus released.

The oil line L-99, that has been communicating with the drain port through the 4-5 shift valve 61, communicates with the oil line L-68 as the 4-5 shift valve 61 takes the right half position. Thereby, the D range pressure $P_D$ is supplied to the hydraulic servo C-3 of the third clutch C3 through the oil lines L-11, L-40, L-68, and L-99. The clutch C3 is thus engaged.

In the automatic transmission 11 described, one or more predetermined friction engagement elements are engaged when achieving a certain speed. If a friction engagement element not required to be engaged is engaged because a failure state occurs in a solenoid valve, such as the first to third solenoid valves SL1 to SL3, there is the possibility that the change gear apparatus 13 interlocks.

For example, the first clutch C1 and the first brake B1 are engaged at the same time in the second speed of the forward range, the first clutch C1 and the fourth clutch C0 are engaged at the same time in the third speed, and the fourth clutch C0 and the first brake B1 are engaged at the same time in the fourth and fifth speeds. However, when a failure in a solenoid valve occurs, and the first clutch C1 and the fourth clutch C0, as two friction engagement elements, and the first brake B1, as another friction engagement element, are engaged at the same time, the change gear apparatus 13 interlocks.

To prevent the first clutch C1, the fourth clutch C0, and the first brake B1 from being engaged at the same time, the structure is such that the clutch apply control valve 66 blocks the supply of the C-1 control pressure $P_{C1}$ to the hydraulic servo C-1 and the supply of the C-0 control pressure $P_{C0}$ to the hydraulic servo C-0 when the C-1 control pressure $P_{C1}$ is about to be supplied to the hydraulic servo C-1, the C-0 control pressure $P_{C0}$ to the hydraulic servo C-0, and the B-1 control pressure $P_{B1}$ to the hydraulic servo B-1, respectively, to block the hydraulic pressure to the B-1 control valve 55.

For this purpose, the B-1 apply control valve 62 is provided with spools a, b (FIG. 1) and, at the same time, the spool a comprises lands a1 to a5; a signal hydraulic chamber e3 is defined by the land a3, a signal hydraulic chamber e4 by the land a4, a signal hydraulic chamber e5 by the land a5, and a signal hydraulic chamber e by the spool b. In addition, the spring f is disposed abutting the land a1. If the areas of the lands a1 to a5 as defined as Su1 to Su5, the areas of Su1 to Su5 are:

Su1=Su2=Su3>Su4>Su5.

Consequently, normally, the signal hydraulic chamber e is supplied with a line pressure $P_L$, and the line pressure $P_L$ pushes the spools a, b so that the B-1 apply control valve 62 takes the left half position. A spring f also pushes the spool a so that the B-1 apply control valve 62 takes the left half position.

The clutch apply control valve 66 is provided with a spool a, and the spool a comprises lands a1 to a6; a signal hydraulic chamber e1 is defined by the land a1, a signal hydraulic chamber e2 by the land a2, and the signal hydraulic chamber e3 by the land a3. Moreover, hydraulic pressure generation detection means for detecting the generation of the C-1 control pressure $P_{C1}$ and C-0 control pressure $P_{C0}$ is comprised of the signal hydraulic chambers e1, e3, the signal hydraulic chambers e1, e3 also comprising the input section. In addition, the spring f is disposed abutting the land a6. If the areas of the lands a1 to a6 are defined as Su1 to Su6, the areas of Su1 to Su6 are:

Su1<Su2<Su3=Su4=Su5=Su6.

In this case, when the C-1 control pressure $P_{C1}$ is generated, the C-1 control pressure $P_{C1}$ is supplied to the signal hydraulic chamber e1 through the oil lines L-35, L-81, and the clutch apply control valve 66 takes the left half position. Then the C-1 control pressure $P_{C1}$ is supplied to the clutch apply control valve 66 through the oil lines L-35, L-55, further to the hydraulic servo C-1 through the oil line L-57.

Moreover, when the C-0 control pressure $P_{C0}$ is generated, the C-0 control pressure $P_{C0}$ is supplied to the signal hydraulic chamber e3 through the oil lines L-37, L-38, and the clutch apply control valve 66 takes the left half position. Then the C-0 control pressure $P_{C0}$ is supplied to the clutch apply control valve 66 through the oil lines L-37, L-52, further to the hydraulic servo C-0 through the oil line L-53.

When the C-1 control pressure $P_{C1}$, C-0 control pressure $P_{C0}$, and B-1 control pressure $P_{B1}$ are generated simultaneously, the C-1 control pressure $P_{C1}$ is supplied to the signal hydraulic chambers e4, e5 of the B-1 apply control valve 62 through the oil line L-63, and the C-0 control pressure $P_{C0}$ supplied thereto through the oil line L-62. Accordingly, the spool a is pushed by a force corresponding to the area difference between the lands a4, a5 and a force corresponding to the area of the land a5 so that the B-1 apply control valve 62 takes the right half position. On the other hand, the B-1 control pressure $P_{B1}$ is supplied to the B-1 apply control valve 62 through the oil line L-25, then sent to the oil line L-71, and then supplied again to the signal hydraulic chamber e3 of the B-1 apply control valve 62 through the oil line L-71, so as to push the spool a by a force corresponding to the area difference between the lands a3, a4 so that the B-1 apply control valve 62 takes the right half position.

At this time, the spool a is pushed against the line pressure $P_L$ supplied to the signal hydraulic chamber e and the spring load of the spring f, and the B-1 apply control valve 62 takes the right half position. Accordingly, the oil lines L-73 and L-64 communicate, and the D range pressure $P_D$ is supplied to the clutch apply control valve 66 as the signal pressure $P_{FS}$ through the oil lines L-64, L-79 and, with the spring f, pushes the spool a by a force corresponding to the area of the land a6 so that the clutch apply control valve 66 takes the right half position. As a result, the clutch apply control valve 66 takes the right half position.

The signal hydraulic chambers e4, e5 connected to the oil line L-63 in the B-1 apply control valve 62 comprise a first input section for detecting the generation of the C-0 control pressure $P_{C0}$ and C-1 control pressure $P_{C1}$, while the signal hydraulic chamber e3 comprises a second input section for detecting the generation of the B-1 control pressure $P_{B1}$. The signal hydraulic chamber e6 to which the oil line L-79 is connected in the clutch apply control valve 66 comprises a hydraulic pressure supply detection section for detecting a simultaneous generation of the C-1 control pressure $P_{C1}$, C-0 control pressure $P_{C0}$, and B-1 control pressure $P_{B1}$ and their supply to the B-1 apply control valve 62.

At this time, communication is blocked between the oil lines L-26, L-24, and the D range pressure $P_D$ is no longer supplied to the B-1 control valve 55. Consequently, in the B-1 control valve 55, the B-1 control pressure $P_{B1}$ is not generated, and the B-1 control pressure $P_{B1}$ is not supplied to the hydraulic servo B-1. In this case, a port P-24 connected to the oil line L-24 in the clutch apply control valve 66 comprises a section not supplied with hydraulic pressure.

When the B-1 apply control valve 62 takes the right half position, communication is blocked between the oil lines L-25, L-71, the oil line L-72 and the oil line L-71 communicate each other, the D range pressure $P_D$ is supplied to the B-1 apply control valve 62 through the oil line L-71 and pushes the spool a by a force corresponding to the area difference between the lands a3, a4 so that the B-1 apply control valve 62 takes the right half position. Consequently, the B-1 apply control valve 62 remains in the right half position.

When the clutch apply control valve 66 takes the right half position, communication is blocked between the oil lines L-55, L-57, the communication is blocked between the oil lines L-52, L-53, and the C-1 control pressure $P_{C1}$ and C-0 control pressure $P_{C0}$ are no longer supplied to the hydraulic servo C-1 and the hydraulic servo C-0 respectively, while the D range pressure $P_D$ is supplied to the clutch apply control valve 66 through the oil line L-40 and further supplied to the hydraulic servo C-1 through the oil line L-57, and, at the same time, to the clutch apply control valve 66 through the oil lines L-40, L-61, and further supplied to the hydraulic servo C-0 through the oil line L-53. An input section comprised of input ports P-55, P-52 connected to the oil lines L-55, L-52 in the clutch apply control valve 66, while an output section is comprised of output ports P-57, P-53 connected to the oil lines L-57, L-53.

Thus, the C-1 control pressure $P_{C1}$, C-0 control pressure $P_{C0}$, and B-1 control pressure $P_{B1}$ are not supplied simultaneously to the hydraulic servos C-1, C-0, and B-1 respectively. Also the first clutch C1, fourth clutch C0 and first brake B1 are not engaged simultaneously. Therefore, interlocking is prevented in the change gear apparatus 13.

In the B-1 apply control valve 62, the area of the lands a1 to a5 and the spring load of the spring f are set so that the B-1 apply control valve 62 takes the right half position when all of the C-1 control pressure $P_{C1}$, C-0 control pressure $P_{C0}$, and B-1 control pressure $P_{B1}$ are supplied to the B-1 apply control valve 62, and the B-1 apply control valve 62 takes the left half position when only two of the C-1 control pressure $P_{C1}$, C-0 control pressure $P_{C0}$, and B-1 control pressure $P_{B1}$ are supplied to the B-1 apply control valve 62.

In the clutch apply control valve 66, the area of the lands a1 to a6 and the spring load of the spring f are set so that, in case that the signal pressure $P_{FS}$ is not supplied through the oil lines L-64, L-79, the clutch apply control valve 66 takes the left half position when at least one of the C-1 control pressure $P_{C1}$ and C-0 control pressure $P_{C0}$ is supplied to the clutch apply control valve 66, and the clutch apply control valve 66 takes the right position when the signal pressure $P_{FS}$ is supplied through the oil lines L-64, L-79.

To achieve a predetermined speed, it is necessary to supply the hydraulic servo of predetermined friction engagement elements selected in correspondence to the speed with hydraulic pressure, and when the first to third solenoid valves SL1 to SL3, and respective control valves such as the B-1 control valve 55, the C-1 control valve 57, and the C-0 control valve 64 and others are put in a first unsupplied state inhibiting supply to the respective hydraulic servo of hydraulic pressure, a neutral state is formed in the change gear apparatus 13.

For example, in the first speed and second speed of the forward range, the first clutch C1 is engaged; however, when a failure, such as valve stick occurs in the C-1 control valve 57, the C-1 control pressure $P_{C1}$ is not generated and the clutch apply control valve 66 is not supplied with the C-1 control pressure $P_{C1}$ inhibiting the engagement of the first clutch C1, the neutral state is formed in the change gear apparatus 13, and the first speed or second speed can not be achieved.

Therefore, in the present embodiment, when the C-1 control pressure $P_{C1}$ is not generated and, in the clutch apply control valve 66, the signal hydraulic chamber e1 is no longer supplied with the C-1 control pressure $P_{C1}$ through the oil line L-81, the spool a is pushed by the spring f so that the clutch apply control valve 66 takes the right half position. Consequently, the D range pressure $P_D$ as another hydraulic pressure is supplied to the clutch apply control valve 66 through the oil line L-40, and further to the hydraulic servo C-1 through the oil line L-57, and at the same time, to the clutch apply control valve 66 through the oil lines L-40, L-61, and further to the hydraulic servo C-0 through the oil line L-53. As a result, the first clutch C1 and the fourth clutch C0 are engaged, and at the same time, the third clutch C3 is engaged, to achieve an approximate fourth speed.

In the third speed of the forward range, the first clutch C1 and the fourth clutch C0 are engaged; however, when a failure such as valve stick occurs in the C-1 control valve 57, the C-1 control pressure $P_{C1}$ is not generated and the clutch apply control valve 66 is not supplied with the C-1 control pressure $P_{C1}$ inhibiting engagement of the first clutch C1, the neutral state is formed in the change gear apparatus 13, and the third speed can not be achieved.

In the third speed, thus, when a failure, such as valve stick does not occur in the C-0 control valve 64, the C-0 control pressure $P_{C0}$ is generated, and the signal hydraulic chamber e3 is supplied with the C-0 control pressure $P_{C0}$ through the oil lines L-37, L-38; so even when the C-1 control pressure $P_{C1}$ is not generated and the signal hydraulic chamber e1 is no longer supplied with the C-1 control pressure $P_{C1}$ through the oil line L-81, the spool a remains in the left half position.

Therefore, neutral state detection processing means (not shown) of the control apparatus loads the revolution speed of the input shaft 16, detected by an input shaft rotation speed detection sensor, as an input shaft rotation speed $N_I$ and loads the revolution speed of an output shaft 35, detected by an output shaft rotation speed detection sensor as an output shaft rotation speed $N_O$, calculates an actual gear change ratio γ of the real change gear apparatus 13:

$$\gamma = N_I/N_O$$

and compares the actual gear change ratio γ and a calculated theoretical gear change ratio $\gamma_{TH}$ of the change gear apparatus 13.

Then, it is judged if a difference Δγ between the actual gear change ratio γ and theoretical gear change ratio $\gamma_{TH}$:

$$\Delta\gamma = \gamma - \gamma_{TH}$$

falls within a predetermined range. If the difference Δγ falls within the range, the neutral state detection processing means does not detect the neutral state, and achieves the predetermined speed by engaging controllable friction engagement elements. If the difference Δγ falls out of the range, the neutral state is detected. When the neutral state is detected, solenoid valve drive processing means (not shown) of the control apparatus sets the value of the first solenoid signal SG1, second solenoid signal SG2 and third solenoid signal SG3 to 0, and turns OFF each solenoid. In the present embodiment, as the first to third solenoid valves SL1 to SL3 are normally open type solenoid valves, the signal hydraulic pressure is generated when each solenoid is OFF, and the C-1 control pressure $P_{C1}$, C-0 control pressure $P_{C0}$, and B-1 control pressure $P_{B1}$ are generated.

In this case, as mentioned above, the B-1 apply control valve 62 and the clutch apply control valve 66 take the right half position, the B-1 control pressure $P_{B1}$ is not generated in the B-1 control valve 55, and the B-1 control pressure $P_{B1}$ is no longer supplied to the hydraulic servo B-1. On the other hand, in the clutch apply control valve 66, the D range pressure $P_D$, as another hydraulic pressure, is supplied to the hydraulic servos C-1, C-0. As a result, the first clutch C1 and the fourth clutch C0 are engaged and, at the same time, the third clutch C3 is engaged, to achieve an approximate fourth speed.

In the fourth and fifth speeds of the forward range, the fourth clutch C0 and the first brake B1 are engaged. However, when a failure, such as valve stick occurs in the C-0 control valve 64, the B-1 control valve 55 or others, the C-0 control pressure $P_{C0}$ and B-1 control pressure $P_{B1}$ are not generated, and the B-1 apply control valve 62 and the clutch apply control valve 66 are no longer supplied with the C-0 control pressure $P_{C0}$ and B-1 control pressure $P_{B1}$, inhibiting engagement of the fourth clutch C0 and the first brake B1, the neutral state is formed in the change gear apparatus 13, and the fourth speed and fifth speed can not be achieved.

Therefore, in the present embodiment, when the C-0 control pressure $P_{C0}$ is not generated and, in the clutch apply control valve 66, the signal hydraulic chamber e3 is no longer supplied with the C-0 control pressure $P_{C0}$ through the oil line L-38, the spool a is pushed by the spring f so that the clutch apply control valve 66 takes the right half position. Consequently, the D range pressure $P_D$ as another hydraulic pressure is supplied to the clutch apply control valve 66 through the oil line L-40; to the hydraulic servo C-1 through the output port P-57 and the oil line L-57; to the clutch apply control valve 66 through the oil lines L-40, L-61; and to the hydraulic servo C-0 through the outlet port P-53 and the oil line L-53. As a result, the first clutch C1 and the fourth clutch C0 are engaged, and at the same time, the third clutch C3 is engaged, to achieve an approximate fourth speed.

When the B-1 control pressure $P_{B1}$ is not generated, the neutral state detection processing means judges if the difference $\Delta\gamma$ falls within the predetermined range. If the difference $\Delta\gamma$ falls within the range, the neutral state detection processing means does not detect the neutral state, and the predetermined speed is achieved by engaging friction engagement elements free of failure. If the difference $\Delta\gamma$ falls out of the range, the neutral state detection processing means detects the neutral state.

When the neutral state is detected, the solenoid valve drive processing means sets the value of the first solenoid signal SG1, second solenoid signal SG2 and third solenoid signal SG3 to 0, turns OFF each solenoid, and the C-1 control pressure $P_{C1}$, C-0 control pressure $P_{C0}$, and B-1 control pressure $P_{B1}$ are generated.

In this case, as mentioned before, the B-1 apply control valve 62 and the clutch apply control valve 66 take the right half position, the B-1 control pressure $P_{B1}$ is not generated in the B-1 control valve 55, and the B-1 control pressure $P_{B1}$ is not supplied to the hydraulic servo B-1. On the other hand, in the clutch apply control valve 66, the D range pressure $P_D$, as another hydraulic pressure, is supplied to the hydraulic servos C-1, C-0. As a result, the first clutch C1 and the fourth clutch C0 are engaged and, at the same time, the third clutch C3 is engaged, to achieve an approximate fourth speed.

Thus, among the C-1 control pressure $P_{C1}$, C-0 control pressure $P_{C0}$, and B-1 control pressure $P_{B1}$, when a hydraulic pressure necessary for achieving the speed is not generated, a predetermined hydraulic pressure may be supplied to the hydraulic servo, and the speed corresponding to the hydraulic servo can be achieved, thereby preventing the neutral state from being formed in the change gear apparatus 13.

In addition, as the third speed is achieved by engaging the first clutch C1 and the fourth clutch C0 as two friction engagement elements, a gear change from the fourth or fifth speed to a lower speed is not performed in the change gear apparatus. Therefore, a large engine brake is not applied and the gear change shock occurrence can be suppressed. As a speed approximate to the fourth speed can be achieved by engaging the third clutch C3, the gear change shock occurrence can be further suppressed.

In order to prevent the gear change shock from occurring, during the shift down gear by changing combinations of a plurality of friction engagement elements, or the shift up gear change with the accelerator pedal released, the underlap control may be performed, respective solenoid valves and respective control valves are set in the second unsupplied state for a predetermined time during the gear change, and no hydraulic pressure is supplied to any hydraulic servo, or only a low pressure is supplied such that the clutch is not engaged.

For example, when the 3-4 gear change is performed with the accelerator pedal released, it is necessary to release the first clutch C1 and to engage the first brake B1, and when the gear change starts, the hydraulic control processing means (not shown) of the control apparatus lowers the C-1 control pressure $P_{C1}$ as released side pressure in a predetermined pattern, and at the same time, increases the B-1 control pressure $P_{B1}$ as an engaged side pressure in a predetermined pattern.

At this time, underlap control processing means (not shown) of the control apparatus performs the underlap control and, as shown in FIG. 6, lowers the C-1 control pressure $P_{C1}$ and B-1 control pressure $P_{B1}$ sufficiently during a predetermined time $\tau$ within a predetermined gear change so that the C-1 control pressure $P_{C1}$ and B-1 control pressure $P_{B1}$ are not supplied respectively to the hydraulic servos C-1, B-1 (in reality, a slight amount of the C-1 control pressure $P_{C1}$ and B-1 control pressure $P_{B1}$ are supplied).

In this case, though the C-1 control pressure $P_{C1}$ is no longer supplied to the signal hydraulic chamber e1, as the C-0 control pressure $P_{C0}$ acts on the signal hydraulic chamber e3, the clutch apply control valve 66 can remain in the left half position.

Therefore, the underlap control processing means performs the underlap control, and lowers the C-1 control pressure $P_{C1}$ and B-1 control pressure $P_{B1}$ sufficiently during a predetermined time $\tau$ within the gear change so that the C-1 control pressure $P_{C1}$ and B-1 control pressure $P_{B1}$ are not supplied respectively to the hydraulic servos C-1, B-1.

The spring load of the spring f of the clutch apply control valve 66 generates a counter force against the switching force to switch over the clutch apply control valve 66 by any one or more hydraulic pressures among the C-1 control pressure $P_{C1}$, C-0 control pressure $P_{C0}$, and the signal hydraulic pressure $P_{S4}$. Further, the spring means comprises countering means.

When the 4-2 gear change is performed, it is necessary to release the fourth clutch C0 and engage the first clutch C1, and when the gear change starts, the hydraulic control processing means lowers the C-0 control pressure $P_{C0}$ as a released side pressure in a predetermined pattern, and at the same time, increases the C-1 control pressure $P_{C1}$ as engaged side pressure in a predetermined pattern.

At this time, the underlap control processing means performs the underlap control and, lowers the C-0 control pressure $P_{C0}$ and the C-1 control pressure $P_{C1}$ sufficiently during a predetermined time $\tau$ within the gear change so that the C-0 control pressure $P_{C0}$ and the C-1 control pressure $P_{C1}$ are not supplied respectively to the hydraulic servos C-0, C-1.

When the C-0 control pressure $P_{C0}$ is not supplied to the signal hydraulic chamber e3 and the clutch apply control valve 66 takes the right half position, the D range pressure $P_D$ is supplied to the clutch apply control valve 66 through the oil line L-40; to the hydraulic servo C-1 through the oil line L-57; to the clutch apply control valve 66 through the oil lines L-40, L-61; and, further, to the hydraulic servo C-0 through the oil line L-53. In this case, the first clutch C1 and the fourth clutch C0 are engaged to achieve the third speed, and the underlap control can not be performed. As a result, an intended gear change can not be executed appropriately.

Then, the failsafe inhibition processing means (not shown) of the control apparatus, operates to transmit a fourth solenoid signal SG4 to the fourth solenoid valve S4, turn ON the solenoid and generate the signal hydraulic pressure $P_{S4}$ during a predetermined period of time T (T>τ) from the gear change start to the gear change end during a predetermined gear change as shown in FIG. 7. As the solenoid relay valve 56 takes the right half position in the second speed, the oil line L-18 and the oil line L-29 are connected, the signal hydraulic pressure $P_{S4}$ is supplied to the signal hydraulic chamber e2, and the clutch apply control valve 66 takes the left half position.

Therefore, the C-0 control pressure $P_{C0}$ and the C-1 control pressure $P_{C1}$ can be lowered sufficiently during the time τ with the clutch apply control valve 66 taking the left half position, so that the C-0 control pressure $P_{C0}$ and the C-1 control pressure $P_{C1}$ are not supplied respectively to the hydraulic servos C-0, C-1.

Accordingly, the underlap control can be performed and the intended gear change can be executed appropriately, even when the hydraulic pressure supplied to the hydraulic servo drops during the gear change performed by releasing the hydraulic servo of at least one friction engagement element, as the failsafe by the clutch apply control valve 66 is inhibited during the predetermined period of time T.

Although in FIG. 7 the period of time T is set to a period from the gear change start to the gear change end, the period of time T may also be set in correspondence to the C-1 control pressure $P_{C1}$, C-0 control pressure $P_{C0}$, B-1 control pressure $P_{B1}$, the spring load of the spring f of the clutch apply control valve 66 or others. In short, in the case of the 4-2 gear change, the C-1 control pressure $P_{C1}$ is lowered when the first clutch C1 is released, the C-0 control pressure $P_{C0}$ is increased when the fourth clutch C0 is engaged, and the C-1 control pressure $P_{C1}$ and the C-0 control pressure $P_{C0}$ are lowered sufficiently during the time τ. At this time, if, in the clutch apply control valve 66, the value obtained by adding the C-0 control pressure $P_{C0}$, C-1 control pressure $P_{C1}$, and signal hydraulic pressure $P_{S4}$ is lower than the spring load, the clutch apply control valve 66 takes the right half position. So, the period of time T is set in calculation so that the value obtained by adding the C-0 control pressure $P_{C0}$, C-1 control pressure $P_{C1}$, and signal hydraulic pressure $P_{S4}$ is higher than the spring load.

Now, a second embodiment of the invention will be described. Those elements having a structure the same as the first embodiment will be indicated by the same numeral, and the explanation thereof will be omitted.

Figure 8:
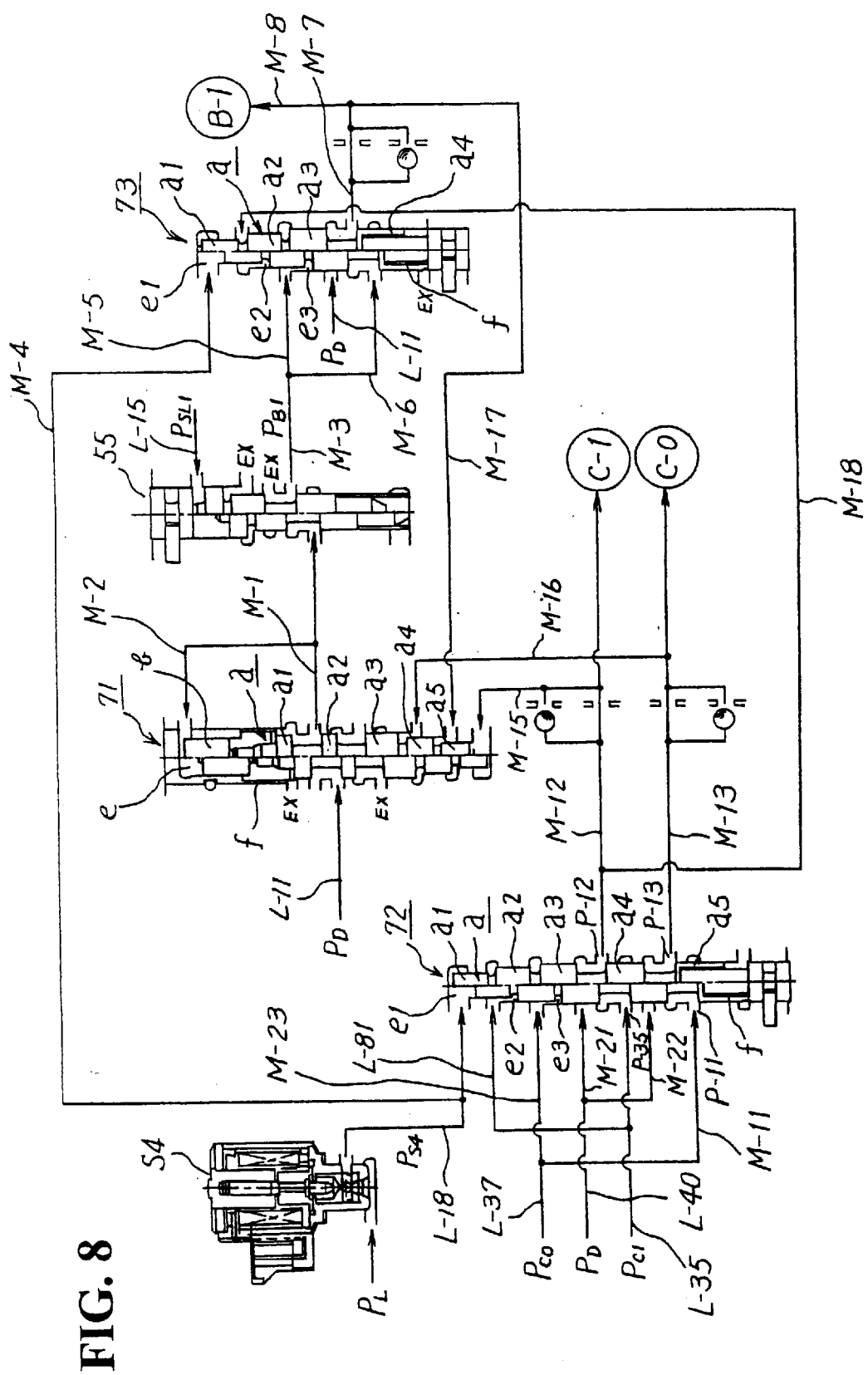
FIG. 8 is a diagram showing essential parts of a hydraulic circuit in accordance with a second embodiment of the invention.

FIG. 8 shows essential parts of a hydraulic circuit in accordance with the second embodiment of the invention. In the figure, a first B-1 apply control valve 71, a clutch apply control valve 72, and a second B-1 apply control valve 73 are shown. The first B-1 apply control valve 71, clutch apply control valve 72, and second B-1 apply control valve 73 comprise an auxiliary hydraulic pressure supply means and a failsafe means.

The first B-1 apply control valve 71 is provided with the spools a, b. The spool a comprises the lands a1 to a5, and the spool b defines a signal hydraulic chamber e. Further, the spring f is disposed abutting the land a1. Normally, the spring f pushes the spool a so that the first B-1 apply control valve 71 takes the left half position. If the areas of the lands a1 to a5 are defined as Su1 to Su5, the areas Su1 to Su5 are:

Su1=Su2=Su3>Su4>Su5.

The clutch apply control valve 72 is provided with the spool a, and the spool a comprises the lands a1 to a5; the signal hydraulic chamber e1 is formed by the land a1, the signal hydraulic chamber e2 by the land a2, and the signal hydraulic chamber e3 by the land a3. In addition, the spring f is disposed abutting the land a5. If the areas of the lands a1 to a5 arc defined as Su1 to Su5, the areas Su1 to Su5 are:

Su1<Su2<Su3=Su4=Su5.

Moreover, the second B-1 apply control valve 73 is provided with the spool a comprising the lands a1 to a4. There, the signal hydraulic chamber e1 is defined by the land a1, the signal hydraulic chamber e2 by the land a2, and the signal hydraulic chamber e3 by the land a3. In addition, the spring f is disposed abutting the land a4. Suppose the area of the lands a1 to a4 be Su1 to Su4, the areas Su1 to Su4 are:

Su1<Su2<Su3=Su4.

The first B-1 apply control valve 71, comprised of a switching valve, takes selectively the left half position as a first position, and the right half position as a second position, and takes normally the left half position to communicate the oil line L-11 with an oil line M-1. Therefore, receiving the D range pressure $P_D$ supplied through the oil line L-11, the first B-1 apply control valve 71 supplies D range pressure $P_D$ to the B-1 control valve 55, as hydraulic pressure supply means, through the oil line M-1. The D range pressure $P_D$ of the oil line M-1 is also supplied to the signal hydraulic chamber e of the first B-1 apply control valve 71 through an oil line M-2.

The first B-1 apply control valve 71 takes the right half position when the C-1 control pressure $P_{C1}$ is supplied through an oil line M-15, the C-0 control pressure $P_{C0}$ through an oil line M-16, and the B-1 control pressure $P_{B1}$ through an oil line M-17.

The B-1 control valve 55, receives the signal hydraulic pressure $P_{SL1}$ supplied through the oil line L-15, regulates the D range pressure $P_D$ supplied through the oil line M-1, generates the B-1 control pressure $P_{B1}$, and supplies the B-1 control pressure $P_{B1}$ to the second B-1 apply control valve 73 through the oil line M-3.

The second B-1 apply control valve 73 takes selectively the left half position as the first position, and the right half position as the second position, takes the left half position when the signal hydraulic pressure $P_{S4}$ is supplied through the oil lines L-18, M-4, or the B-1 control pressure $P_{B1}$ is supplied through the oil lines M-3, M-5, or the C-1 control pressure $P_{C1}$ is supplied through oil lines M-12, M-18, receives through an oil line M-6 the B-1 control pressure $P_{B1}$ supplied through the oil line M-3, and supplies it to the hydraulic servo B-1 through oil lines M-7, M-8.

The clutch apply control valve 72 takes selectively the left half position as the first position, and the right half position as the second position, takes the left half position when the signal hydraulic pressure $P_{S4}$ is supplied through the oil line L-18, or the C-1 control pressure $P_{C1}$ is supplied through the oil lines L-35, L-81, or the C-0 control pressure $P_{C0}$ is supplied through the oil lines L-37, M-23, or through the oil lines L-37, M-11, receives the C-1 control pressure $P_{C1}$ through the oil line L-35 and supplies C-1 control pressure $P_{C1}$ to the hydraulic servo C-1 through the oil line M-12, and supplies the C-0 control pressure $P_{C0}$ supplied through the oil lines L-37, M-11 to the hydraulic servo C-0 through an oil line M-13.

When the C-1 control pressure $P_{C1}$, C-control pressure $P_{C0}$, and B-1 control pressure $P_{B1}$ are generated simultaneously to be supplied to the hydraulic servos C-1, C-0 and B-1 respectively, the C-1 control pressure $P_{C1}$ is supplied to the first B-1 apply control valve 71 through the oil lines M-12, M-15, the C-0 control pressure $P_{C0}$ through the oil lines M-13, M-16, and the B-1 control pressure $P_{B1}$ through the oil lines M-7, M-17 respectively. Accordingly, the spool a is pushed by a force corresponding to the area difference between the lands a3, a4 and by a force corresponding to the area of the land a5 so that the first B-1 apply control valve 71 takes the right half position. Then, communication is blocked between the oil lines L-11, M-1, and the oil line M-1 communicates with the drain port, the D range pressure $P_D$ is no longer supplied to the B-1 control valve 55. Consequently, the B-1 control pressure $P_{B1}$ is not generated in the B-1 control valve 55, so that the hydraulic servo B-1 is not supplied with the B-1 control pressure $P_{B1}$.

Accordingly, the C-1 control pressure $P_{C1}$, control pressure $P_{C0}$, and B-1 control pressure $P_{B1}$ are not supplied simultaneously to the hydraulic servos C-1, C-0 and B-1 respectively. Also the first clutch C1 (FIG. 2), fourth clutch C0, and first brake B1 are not engaged simultaneously. Therefore, interlocking is prevented in the change gear apparatus 13.

In the first B-1 apply control valve 71, the area of the lands a1 to a5 and the spring load of the spring f are set so that the first B-1 apply control valve 71 takes the right half position when all of the C-1 control pressure $P_{C1}$, C-0 control pressure $P_{C0}$, and B-1 control pressure $P_{B1}$ are supplied to the first B-1 apply control valve 71, and the first B-1 apply control valve 71 takes the left half position when only two of the C-1 control pressure $P_{C1}$, C-0 control pressure $P_{C0}$, and B-1 control pressure $P_{B1}$ are supplied to the first B-1 apply control valve 71.

For example, in the first speed and second speed of the forward range, the first clutch C1 is engaged; however, when a failure, such as valve stick, occurs in the C-1 control valve 57 (FIG. 4), the C-1 control pressure $P_{C1}$ is not generated and the clutch apply control valve 66 is no longer supplied with the C-1 control pressure $P_{C1}$, inhibiting engagement of the first clutch C1, the neutral state is formed in the change gear apparatus 13, and the first speed or second speed can not be achieved.

Therefore, in the present embodiment, when the C-1 control pressure $P_{C1}$ is not generated and, in the clutch apply control valve 72, the signal hydraulic chamber e1 is no longer supplied with the C-1 control pressure $P_{C1}$ through the oil line L-81 in the signal hydraulic chamber e2, the spool a is pressed by the spring f and the clutch apply control valve 72 takes the right half position. Consequently, the D range pressure $P_D$, as another hydraulic pressure, is supplied to the clutch apply control valve 72 through the oil lines L-40, M-21, and further to the hydraulic servo C-1 through the oil line M-12, and at the same time, to the clutch apply control valve 72 through the oil lines L-40, M-22, and further to the hydraulic servo C-0 through the oil line M-13. As a result, the first clutch C1 and the fourth clutch C0 are engaged to achieve the third speed.

In the third speed of the forward range, the first clutch C1 and the fourth clutch C0 are engaged; however, when a failure, such as valve stick, occurs in the C-1 control valve 57 between the C-1 control valve 57 and C-0 control valve 64, the C-1 control pressure $P_{C1}$ is not generated, and the clutch apply control valve 72 is no longer supplied with the C-1 control pressure $P_{C1}$, inhibiting engagement of the first clutch C1, the neutral state is formed in the change gear apparatus 13, and the third speed can not be achieved.

In this case, because a failure, such as valve stick, does not occur in the C-0 control valve 64, the C-0 control pressure $P_{C0}$ is generated, and the signal hydraulic chamber e3 is supplied with the C-0 control pressure $P_{C0}$ through the oil lines L-37, M-23; so even when the C-1 control pressure $P_{C1}$ is not generated and the signal hydraulic chamber e2 is no longer supplied with the C-1 control pressure $P_{C1}$ through the oil line L-81, the spool a remains in the left half position. Further, the second B-1 apply control valve 73 takes the right half position, as the signal hydraulic chamber e2 is not supplied with the C-1 control pressure $P_{C1}$ through the oil lines M-12, M-18, and communicates the oil lines L-11, M-7. Therefore, the D range pressure $P_D$ as another hydraulic pressure is supplied to the hydraulic servo B-1, through the oil lines L-11, M-7, M-8. As a result, the fourth clutch C0 and the first brake B1 are engaged to achieve the fourth speed.

In the fourth speed and fifth speed of the forward range, the fourth clutch C0 and the first brake B1 are engaged; however, when a failure, such as valve stick, occurs in the C-0 control valve 64, B-1 control valve 55 (FIG. 5) or others, the C-0 control pressure $P_{C0}$ and B-1 control pressure $P_{B1}$ are not generated, and the clutch apply control valve 72 and the second B-1 apply control valve 73 are no longer supplied with the C-0 control pressure $P_{C0}$ and B-1 control pressure $P_{B1}$, inhibiting engagement of the fourth clutch C0 and the first brake B1, the neutral state is formed in the change gear apparatus 13, and the fourth and fifth speed can not be achieved.

Therefore, in the present embodiment, when the C-0 control pressure $P_{C0}$ is not generated and, in the clutch apply control valve 72, the signal hydraulic chamber e3 is no longer supplied with the C-0 control pressure $P_{C0}$ through the oil lines L-37, M-23, the spool a is pushed by the spring f so that the clutch apply control valve 72 takes the right half position. Consequently, the D range pressure $P_D$ as another hydraulic pressure is supplied to the clutch apply control valve 72 through the oil lines L-40, M-21; to the hydraulic servo C-1 through the oil line M-12; to the clutch apply control valve 72 through the oil lines L-40, M-22; and to the hydraulic servo C-0 through the oil line M-13. As a result, the first clutch C1 and the fourth clutch C0 are engaged to achieve the third speed.

In this case, as mentioned before, the first B-1 apply control valve 71 takes the right half position, and the B-1 control pressure $P_{B1}$ is not generated in the B-1 control valve 55.

When the B-1 control pressure $P_{B1}$ is not generated, the C-0 control pressure $P_{C0}$ is generated, because a failure, such as valve stick, does not occur in the C-0 control valve 64, and the signal hydraulic chamber e3 of the clutch apply control valve 72 is supplied with the C-0 control pressure $P_{C0}$. Therefore, the clutch apply control valve 72 takes the left half position.

Further, as the C-1 control pressure $P_{C1}$ is not generated and the clutch apply control valve 72 takes the left half position, the C-1 control pressure $P_{C1}$ is not supplied to the oil lines M-12, M-18. Therefore, as the signal hydraulic chamber e2 of the second B-1 apply control valve 73 is not supplied with the C-1 control pressure $P_{C1}$ and the B-1 control pressure $P_{B1}$ is not generated, the signal hydraulic chamber e3 is not supplied with the B-1 control pressure $P_{B1}$. Consequently, the second B-1 apply control valve 73 takes the right half position, and the oil lines M-11, M-7 communicate each other, and the hydraulic servo B-1 is supplied with the D range pressure $P_D$, through the oil lines L-11, M-7, and M-8. As a result, the fourth clutch C0 and the first brake B1 are engaged to achieve the fourth speed.

When a hydraulic pressure, among the C-1 control pressure $P_{C1}$, C-0 control pressure $P_{C0}$, and B-1 control pressure $P_{B1}$, necessary for achieving the speed is not generated, a predetermined hydraulic pressure may be supplied to the hydraulic servo so as to achieve the speed, thereby preventing the neutral state from occurring in the change gear apparatus 13. In addition, as the third speed is achieved by engaging the first clutch C1 and the fourth clutch C0 as two friction engagement elements, a gear change from the fourth or fifth speed to a lower speed is not performed in the change gear apparatus. Therefore, a large engine brake is not applied and the gear change shock occurrence can be suppressed.

In order to prevent the gear change shock from occurring, during the shift down gear change by changing combinations of a plurality of friction engagement elements, or the shift up gear change with the accelerator pedal released, underlap control may be performed, respective solenoid valves and respective control valves are set in the second unsupplied state for a predetermined time during the gear change, and no hydraulic pressure is supplied to any hydraulic servo, or only a low pressure is supplied such that the clutch is not engaged.

For example, when the 3-4 gear change is performed with the accelerator pedal released, it is necessary to release the first clutch C1 and to engage the first brake B1, and when the gear change starts, the hydraulic control processing means (not shown) of the control apparatus lowers the C-1 control pressure $P_{C1}$ as released side pressure in a predetermined pattern and, at the same time, increases the B-1 control pressure $P_{B1}$ as engaged side pressure in a predetermined pattern.

At this time, underlap control processing means (not shown) of the control apparatus performs the underlap control and, as shown in FIG. 6, lowers the C-1 control pressure $P_{C1}$ and delays the increase in B-1 control pressure $P_{B1}$ sufficiently during a predetermined time τ during the gear change so that the C-1 control pressure $P_{C1}$ and B-1 control pressure $P_{B1}$ are not supplied respectively to the hydraulic servos C-1, B-1 (in reality, a slight amount of the C-1 control pressure $P_{C1}$ and B-1 control pressure $P_{B1}$ are supplied).

When the C-0 control pressure $P_{C0}$ is not supplied to the signal hydraulic chamber e1 and the clutch apply control valve 72 takes the right half position, the D range pressure $P_D$ is supplied to the clutch apply control valve 72 through the oil lines L-40, M-21, and further to the hydraulic servo C-1 through the oil line M-12, and at the same time, is supplied to the clutch apply control valve 72 through the oil lines L-40, M-22, and further to the hydraulic servo C-0 through the oil line M-13. In this case, the first clutch C1 and the fourth clutch C0 are engaged to achieve the third speed, and the underlap control can not be performed. As a result, an intended gear change can not be executed appropriately.

Then, failsafe inhibition processing means (not shown) of the control apparatus, transmits a fourth solenoid signal SG4 to the fourth solenoid valve S4 as switching means, turns ON the solenoid and generates the signal hydraulic pressure $P_{S4}$ during a predetermined period of time T (T>τ) from the gear change start to the gear change end. The signal hydraulic pressure $P_{S4}$ is supplied to the signal hydraulic chamber e1 of the clutch apply control valve 72 through the oil line L-18, the clutch apply control valve 72 takes the left half position, and at the same time, the signal hydraulic pressure $P_{S4}$ is supplied to the signal hydraulic chamber e1 of the second B-1 apply control valve 73 through the oil lines L-18, M-4, and the second B-1 apply control valve 73 takes the left half position.

Therefore, the C-1 control pressure $P_{C1}$ and B-1 control pressure $P_{B1}$ can be lowered sufficiently during the time τ with the clutch apply control valve 72 and the second B-1 apply control valve 73 taking the left half position, so that the C-1 control pressure $P_{C1}$ and B-1 control pressure $P_{B1}$ are not supplied respectively to the hydraulic servos C-1, B-1.

When the 4-2 gear change is performed, it is necessary to release the fourth clutch C0 and engage the first clutch C1, and when the gear change starts, the hydraulic control processing means lowers the C-0 control pressure $P_{C0}$ as released side pressure in a predetermined pattern, and at the same time, increases the C-1 control pressure $P_{C1}$ as engaged side pressure in a predetermined pattern.

At this time, the underlap control processing means performs the underlap control and, lowers the C-0 control pressure $P_{C0}$ and the C-1 control pressure $P_{C1}$ sufficiently during a predetermined time τ within the gear change so that the C-0 control pressure $P_{C0}$ and the C-1 control pressure $P_{C1}$ are not supplied respectively to the hydraulic servos C-0, C-1.

When the C-0 control pressure $P_{C0}$ is not supplied to the signal hydraulic chamber e3 and the clutch apply control valve 72 takes the right half position, the D range pressure $P_D$ is supplied to the clutch apply control valve 72 through the oil lines L-40, M-21, and further to the hydraulic servo C-1 through the oil line M-12, and at the same time, is supplied to the clutch apply control valve 72 through the oil lines L-40, M-22, and further to the hydraulic servo C-0 through the oil line M-13. In this case, the first clutch C1 and the fourth clutch C0 are engaged to achieve the third speed, and the underlap control can not be performed. As a result, an intended gear change can not be executed appropriately.

Then, the failsafe inhibition processing means, as shown in FIG. 7, transmits a fourth solenoid signal SG4 to the fourth solenoid valve S4, turns ON the solenoid and generates the signal hydraulic pressure $P_{S4}$ during a predetermined period of time T (T>τ) from the gear change start to the gear change end. Accordingly, the clutch apply control valve 72 and the second B-1 apply control valve 73 take the left half position.

Therefore, the C-0 control pressure $P_{C0}$ and the C-1 control pressure $P_{C1}$ can be lowered sufficiently during the time τ with the clutch apply control valve 72 and the second B-1 apply control valve 73 taking the left half position, so that the C-0 control pressure $P_{C0}$ and C-1 control pressure $P_{C1}$ are not supplied respectively to the hydraulic servos C-0, C-1. Accordingly, during the gear change performed by releasing at least one friction engagement element, the underlap control can be performed and the intended gear change can be executed appropriately, even when the hydraulic pressure supplied to the hydraulic servo of the friction engagement element drops, as the failsafe function by the clutch apply control valve 72 and the second B-1 apply control valve 73 is inhibited during the predetermined period of time T.

Among the friction engagement elements to be engaged in the auxiliary change gear 24, that are not described above with respect to the second embodiment, during the failure, the speed is achieved by engaging those friction engagement elements which are engaged in the corresponding speed as in the operation table shown in FIG. 3.

The invention is not limited to the aforementioned embodiments and can be modified variously based on the spirit of the invention, without departing from the scope of the invention.

What is claimed is:
1. A hydraulic control apparatus for an automatic transmission, comprising:

a plurality of friction engagement elements;

a plurality of hydraulic servos engaging and disengaging respectively the plurality of friction engagement elements;

hydraulic pressure supply means for supplying a hydraulic servo of a predetermined friction engagement element selected in correspondence to a gear stage to be achieved with a first hydraulic pressure; and auxiliary hydraulic pressure supply means for supplying the hydraulic servo of the predetermined friction engagement element with a second hydraulic pressure other than the first hydraulic pressure generated by the hydraulic pressure supply means, in the case that the hydraulic pressure supply means is put in a failed state where the hydraulic pressure supply means can not supply the hydraulic servo of the predetermined friction engagement element with the first hydraulic pressure, wherein the auxiliary hydraulic pressure supply means does not supply the hydraulic servo of the predetermined friction engagement element with the second hydraulic pressure in the case that the hydraulic pressure supply means is put in a substantially not supplied state that is different from the failed state where the hydraulic pressure supply means does not supply the hydraulic servo of the predetermined friction engagement element with the first hydraulic pressure for disengaging the predetermined friction engagement element.

2. The hydraulic control apparatus for the automatic transmission according to claim 1, wherein the hydraulic pressure supply means is put in the substantially not supplied state during a predetermined gear change.

3. The hydraulic control apparatus for the automatic transmission according to claim 2, wherein the auxiliary hydraulic pressure supply means is failsafe means, and provided with switching means for not supplying the predetermined hydraulic servo with the second hydraulic pressure during a predetermined gear change.

4. The hydraulic control apparatus for the automatic transmission according to claim 1, wherein the predetermined friction engagement element is two friction engagement elements, forming a state allowing the transmission of power in the gear change, by engaging the two friction engagement elements, and the auxiliary hydraulic pressure supply means is provided with hydraulic pressure generation detection means for detecting the generation of hydraulic pressure to be supplied to the hydraulic servo of at least one friction engagement element of the two friction engagement elements, and does not supply to the predetermined hydraulic servo the second hydraulic pressure, in the case of detection of generation of the first hydraulic pressure.

5. A hydraulic control apparatus for an automatic transmission, comprising:

a plurality of friction engagement elements;

a plurality of hydraulic servos engaging and disengaging respectively the plurality of friction engagement elements;

hydraulic pressure supply means for generating a predetermined hydraulic pressure, and supplying the predetermined hydraulic pressure to the hydraulic servo of a predetermined friction engagement element selected in correspondence to a gear stage to be achieved;

a switching valve including:

a first input section where the predetermined hydraulic pressure generated by the hydraulic pressure supply means is inputted;

a second input section where a second hydraulic pressure, other than the predetermined hydraulic pressure generated by the hydraulic pressure supply means, is inputted;

a third input section where the predetermined hydraulic pressure generated by the hydraulic pressure supply means is provided for switching over the switching valve; and an output section for selectively outputting the predetermined hydraulic pressure inputted to the first input section and the second hydraulic pressure inputted to the second input section to the hydraulic servo of the predetermined friction engagement element; and valve switching means for further switching over the switching valve, so that the first input section and the output section are in communication and substantially no hydraulic pressure is supplied to the hydraulic servo of the predetermined friction engagement element at a time when the switching valve is in a state wherein the predetermined hydraulic pressure is not provided to the third input section and the second input section and the output section are in communication.

6. The hydraulic control apparatus for the automatic transmission according to claim 5, wherein the predetermined friction engagement element comprises two friction engagement elements, forming a state allowing to transmit power in the gear change by engaging the two friction engagement elements, and the predetermined hydraulic pressure to be supplied to the hydraulic servo of the two friction engagement elements is input to the first input section.

7. The hydraulic control apparatus for the automatic transmission according to claim 5, wherein the switching valve is provided with countering means, against the predetermined hydraulic pressure input to the first input section, and generating a counter force against a switching force with which the valve switching means switches over the switching valve.

8. The hydraulic control apparatus for the automatic transmission according to claim 6, having a third friction engagement element in addition to the two friction engagement elements, and wherein the switching valve is further provided with a hydraulic pressure supply detection section for detecting a simultaneous supply of the predetermined hydraulic pressure to be supplied to the two friction engagement elements and the hydraulic servo of the third friction engagement element, wherein the second input section is not supplied with the second hydraulic pressure for not supplying the hydraulic servo of the third friction engagement element upon detection of the simultaneous supply of the predetermined hydraulic pressure to be supplied to the two friction engagement elements and the hydraulic servo of the third friction engagement element.

9. The hydraulic control apparatus for the automatic transmission according to claim 5, comprising a switching control valve, provided with a first input section to which the predetermined hydraulic pressure to be supplied to a hydraulic servo of a predetermined friction engagement element is input, and a second input section to which the second hydraulic pressure to be supplied to the hydraulic servo of a second friction engagement element is input, for generating a signal hydraulic pressure to be supplied to the switching valve when the predetermined hydraulic pressure to be supplied to the hydraulic servo of the predetermined friction engagement element, and the second hydraulic pressure to be supplied to the hydraulic servo of the second friction engagement element are input to the first and second input sections.

10. A hydraulic control apparatus for an automatic transmission, comprising:
a plurality of hydraulic servos engaging and disengaging respectively a plurality of friction engagement elements;
a solenoid and a control valve combination that supplies the hydraulic servo of a predetermined friction engagement element selected in correspondence to a gear stage to be achieved with a first hydraulic pressure; and
an apply control valve that supplies a predetermined hydraulic servo with a second hydraulic pressure other than the first hydraulic pressure supplied by the solenoid and the control valve combination, in the case that the solenoid and the control valve combination is put in a failed state where the solenoid and the control valve combination can not supply the hydraulic servo of the predetermined friction engagement element with the first hydraulic pressure, and for not supplying the predetermined hydraulic servo with the second hydraulic pressure, in the case that the solenoid and the control valve combination is put in a substantially not supplied state where the solenoid and the control valve combination does not supply the hydraulic servo of the predetermined friction engagement element with the first hydraulic pressure.

11. The hydraulic control apparatus for the automatic transmission according to claim 10, wherein the solenoid and the control valve combination is put in the substantially not supplied state during a predetermined gear change.

12. The hydraulic control apparatus for the automatic transmission according to claim 11, wherein the apply control valve provides a failsafe device, and is provided with switching solenoid for not supplying the predetermined hydraulic servo with the second hydraulic pressure during a predetermined gear change.

13. The hydraulic control apparatus for the automatic transmission according to claim 11, wherein the predetermined friction engagement element is two friction engagement elements, forming a state allowing the transmission of power in the gear change, by engaging the two friction engagement elements, and the apply control valve includes a hydraulic pressure generation detection mechanism that establishes the first hydraulic pressure to be supplied to the hydraulic servo of at least one friction engagement element of the two friction engagement elements, and does not supply to the predetermined hydraulic servo the second hydraulic pressure, in the case of the establishment of generation of the first hydraulic pressure.

14. A hydraulic control apparatus for an automatic transmission, comprising:
a plurality of friction engagement elements;
a plurality of hydraulic servos engaging and disengaging respectively the plurality of friction engagement elements;
a first solenoid and control valve combination that supplies a predetermined hydraulic pressure, and supplying the predetermined hydraulic pressure to the hydraulic servo of the predetermined friction engagement element selected in correspondence to a gear stage to be achieved;
a switching valve including:
a first input section where the predetermined hydraulic pressure supplied by the first solenoid and control valve combination is inputted;
a second input section where a second hydraulic pressure, other than the predetermined hydraulic pressure, supplied by a second solenoid and control valve combination, is inputted;
a third input section where the predetermined hydraulic pressure generated by the first solenoid and control valve combination is inputted for switching over the switching valve; and
an output section for selectively outputting the predetermined hydraulic pressure inputted to the first input section and the second hydraulic pressure inputted to the second input section to the hydraulic servo of the predetermined friction engagement element; and
a valve switching solenoid that further switches over the switching valve, so that the first input section and the output section are in communication and substantially no hydraulic pressure is supplied to the hydraulic servo of the predetermined friction engagement element at a time when the switching valve is in a state wherein the predetermined hydraulic pressure is not input to the third input section and the second input section and the output section are in communication.

15. The hydraulic control apparatus for the automatic transmission according to claim 14, wherein the predetermined friction engagement element is two friction engagement elements, forming a state allowing to transmit power in the gear change by engaging the two friction engagement elements, and the predetermined hydraulic pressure to be supplied to the hydraulic servo of the two friction engagement elements is input to the first input section.

16. The hydraulic control apparatus for the automatic transmission according to claim 14, wherein the switching valve is provided with an elastic member against the predetermined hydraulic pressure input to the first input section, and generating a counter force against a switching force with which the valve switching solenoid switches over the switching valve.

17. The hydraulic control apparatus for the automatic transmission according to claim 15, having a third friction engagement element in addition to the two friction engagement elements, and wherein the switching valve is further provided with a hydraulic pressure supply detection section that determines a simultaneous supply of the predetermined hydraulic pressure to be supplied to the two friction engagement elements and the hydraulic servo of the third friction engagement element, wherein the second input section is not supplied with the second hydraulic pressure for not supplying the hydraulic servo of the third friction engagement element upon determination of the simultaneous supply of hydraulic pressure to be supplied to the two friction engagement elements and the hydraulic servo of the third friction engagement element.

18. The hydraulic control apparatus for the automatic transmission according to claim 14, comprising a switching control valve, provided with a first input section to which the predetermined hydraulic pressure to be supplied to a hydraulic servo of a predetermined friction engagement element is input, and a second input section to which the second hydraulic pressure to be supplied to the hydraulic servo of a second friction engagement element is input, for generating a signal hydraulic pressure to be supplied to the switching valve when the predetermined hydraulic pressure to be supplied to the hydraulic servo of the predetermined friction engagement element, and the hydraulic pressure to be supplied to the hydraulic servo of the second friction engagement element are input to the first and second input sections.

* * * * *